(12) United States Patent
Kuo et al.

(10) Patent No.: US 12,169,265 B2
(45) Date of Patent: Dec. 17, 2024

(54) PHOTOGRAPHING OPTICAL LENS SYSTEM, IMAGE CAPTURING UNIT AND ELECTRONIC DEVICE INCLUDING SEVEN LENSES OF +-+-+--, +-+--+-, -+-+-+-, ++-+-+-, OR ++---+- REFRACTIVE POWERS

(71) Applicant: LARGAN PRECISION CO., LTD., Taichung (TW)

(72) Inventors: Tzu-Chieh Kuo, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 1086 days.

(21) Appl. No.: 17/079,068

(22) Filed: Oct. 23, 2020

(65) Prior Publication Data

US 2021/0041674 A1 Feb. 11, 2021

Related U.S. Application Data

(63) Continuation of application No. 16/133,001, filed on Sep. 17, 2018, now Pat. No. 10,852,513.

(30) Foreign Application Priority Data

Mar. 30, 2018 (TW) .................................. 107111127

(51) Int. Cl.
*G02B 13/00* (2006.01)
*G02B 3/04* (2006.01)
(Continued)

(52) U.S. Cl.
CPC ........... *G02B 13/0045* (2013.01); *G02B 3/04* (2013.01); *G02B 9/64* (2013.01); *G02B 13/18* (2013.01); *G02B 27/0025* (2013.01)

(58) Field of Classification Search
CPC ........ G02B 13/0045; G02B 3/04; G02B 9/64; G02B 13/18; G02B 27/0025
See application file for complete search history.

(56) References Cited

U.S. PATENT DOCUMENTS 10,451,845 B2 * 10/2019 Yan ........................... G02B 9/64
11,460,667 B2 * 10/2022 Hu ...................... G02B 13/0045
(Continued)

FOREIGN PATENT DOCUMENTS

CN 106896475 A 6/2017
CN 106896476 A 6/2017
(Continued)

OTHER PUBLICATIONS

CN Office Action in Application No. 201810327295.1 dated Oct. 30, 2020.

*Primary Examiner* — Wen Huang
(74) *Attorney, Agent, or Firm* — Maschoff Brennan

(57) ABSTRACT

A photographing optical lens system includes seven lens elements which are, in order from an object side to an image side: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. The seventh lens element has negative refractive power. The object-side surface of the seventh lens element is concave in a paraxial region thereof. At least one of all lens surfaces of the seven lens elements is aspheric and has at least one inflection point.

19 Claims, 19 Drawing Sheets

(51) Int. Cl.
*G02B 9/64* (2006.01)
*G02B 13/18* (2006.01)
*G02B 27/00* (2006.01)

(56) References Cited

U.S. PATENT DOCUMENTS

| | | | | |
|---|---|---|---|---|
| 2015/0205070 | A1* | 7/2015 | Lee | G02B 13/0045 359/713 |
| 2016/0085054 | A1* | 3/2016 | Asami | G02B 9/64 359/755 |
| 2016/0320590 | A1* | 11/2016 | Mori | G02B 13/0045 |
| 2016/0377844 | A1* | 12/2016 | Cheng | G02B 13/143 359/355 |
| 2017/0254981 | A1* | 9/2017 | Lai | G02B 7/04 |
| 2017/0285304 | A1* | 10/2017 | Lai | G02B 13/06 |
| 2018/0188486 | A1 | 7/2018 | Gong et al. | |
| 2018/0188488 | A1 | 7/2018 | Gong et al. | |
| 2018/0196226 | A1 | 7/2018 | Chang | |
| 2018/0196235 | A1 | 7/2018 | Chang | |
| 2018/0196239 | A1* | 7/2018 | Chang | G02B 13/008 |
| 2019/0041611 | A1* | 2/2019 | Chang | G02B 9/64 |
| 2019/0079270 | A1* | 3/2019 | Tseng | G02B 13/18 |
| 2019/0121089 | A1* | 4/2019 | Fang | G02B 9/64 |
| 2019/0121102 | A1 | 4/2019 | Zhang | |
| 2019/0146185 | A1 | 5/2019 | Chen | |
| 2019/0146188 | A1 | 5/2019 | Lyu | |
| 2019/0154972 | A1 | 5/2019 | Zhang | |
| 2019/0154973 | A1 | 5/2019 | Zhang | |
| 2019/0154974 | A1* | 5/2019 | Chen | G02B 27/0037 |
| 2019/0187414 | A1 | 6/2019 | Zhang | |
| 2019/0204540 | A1 | 7/2019 | Liao | |
| 2019/0204553 | A1 | 7/2019 | Liao | |
| 2019/0243106 | A1 | 8/2019 | Xu | |
| 2019/0278063 | A1 | 9/2019 | Sekine | |
| 2020/0257084 | A1 | 8/2020 | Dai | |
| 2021/0173126 | A1 | 6/2021 | Lee et al. | |

FOREIGN PATENT DOCUMENTS

| | | | |
|---|---|---|---|
| CN | 106896477 A | 6/2017 | |
| CN | 107367827 A | 11/2017 | |
| CN | 107490841 A | 12/2017 | |
| CN | 107621681 A | 1/2018 | |
| CN | 107621683 A | 1/2018 | |
| CN | 107664830 A | 2/2018 | |
| JP | 6363287 B1 * | 7/2018 | ......... G02B 13/0045 |
| WO | 2019174286 A1 | 9/2019 | |

* cited by examiner

PHOTOGRAPHING OPTICAL LENS SYSTEM, IMAGE CAPTURING UNIT AND ELECTRONIC DEVICE INCLUDING SEVEN LENSES OF +−+−+−−, +−+−−−+−, −+−+−+−, ++−+−+−, OR ++−−−+− REFRACTIVE POWERS

RELATED APPLICATIONS

This application is a continuation patent application of U.S. application Ser. No. 16/133,001, filed on Sep. 17, 2018, which claims priority to Taiwan Application 107111127, filed on Mar. 30, 2018, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, desirable aperture size, miniaturization or required field of view. Accordingly, the present disclosure provides an optical system satisfying the aforementioned requirements.

SUMMARY

According to one aspect of the present disclosure, a photographing optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. The seventh lens element has negative refractive power, and the object-side surface of the seventh lens element is concave in a paraxial region thereof. At least one of all lens surfaces of the seven lens elements is aspheric and has at least one inflection point. When an axial distance between the object-side surface of the first lens element and an image surface is TL, a maximum image height of the photographing optical lens system is ImgH, a focal length of the photographing optical lens system is f, a focal length of the second lens element is f2, an entrance pupil diameter of the photographing optical lens system is EPD, a curvature radius of the image-side surface of the seventh lens element is R14, a sum of central thicknesses of all lens elements of the photographing optical lens system is ΣCT, and a central thickness of the seventh lens element is CT7, the following conditions are satisfied:

$TL/\text{ImgH}<1.75;$ $f/\text{EPD}\leq 1.70;$ $f/R14\leq 0;$ $f/f2<0.70;$ and $1.00<\Sigma CT/CT7<20.0.$ According to another aspect of the present disclosure, an image capturing unit includes the aforementioned photographing optical lens system and an image sensor, wherein the image sensor is disposed on the image surface of the photographing optical lens system.

According to still another aspect of the present disclosure, an electronic device includes the aforementioned image capturing unit.

According to yet another aspect of the present disclosure, a photographing optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the seventh lens element is concave in a paraxial region thereof. At least one of all lens surfaces of the seven lens elements is aspheric and has at least one inflection point. There is an air gap in a paraxial region between every adjacent lens element of the seven lens elements. When a focal length of the photographing optical lens system is f, a focal length of the sixth lens element is f6, a focal length of the seventh lens element is f7, an entrance pupil diameter of the photographing optical lens system is EPD, a curvature radius of the image-side surface of the sixth lens element is R12, an axial distance between the object-side surface of the first lens element and an image surface is TL, and a maximum image height of the photographing optical lens system is ImgH, the following conditions are satisfied:

$f/\text{EPD}<1.90;$ $0\leq f/R12;$ $-1.20\leq f6/f7<2.00;$ and $TL/\text{ImgH}<1.55.$ According to yet still another aspect of the present disclosure, a photographing optical lens system includes seven lens elements. The seven lens elements are, in order from an object side to an image side, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the first lens element is convex in a paraxial region thereof. The fourth lens element has negative refractive power. The object-side surface of the seventh lens element is concave in a paraxial region thereof. At least one of all lens surfaces of the seven lens elements is aspheric and has at least one inflection point. When a focal length of the photographing optical lens system is f, a focal length of the fourth lens element is f4, an entrance pupil diameter of the photographing optical lens system is EPD, an axial distance between the object-side surface of the first lens element and an image surface is TL, a maximum image height of the photographing optical lens system is ImgH, a central thickness of the fourth lens element is CT4, an axial distance between the third lens element and the fourth lens element is T34, a curvature radius of the object-side surface of the first lens element is R1, and a curvature radius of the object-side surface of the seventh lens element is R13, the following conditions are satisfied:

$f/EPD<1.90;$ $TL/ImgH<1.55;$ $0<CT4/T34<2.50;$ $-10.0<f4/f\leq0;$ and $-8.0<R13/R1<0.$ According to yet still another aspect of the present disclosure, an image capturing unit includes the aforementioned photographing optical lens system and an image sensor, wherein the image sensor is disposed on the image surface of the photographing optical lens system.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens system includes seven lens elements. The seven lens elements are, in order from an object side to an image side, a first lens element, a second lens element, a third lens element, a fourth lens element, a fifth lens element, a sixth lens element and a seventh lens element.

There can be an air gap in a paraxial region between every adjacent lens element of the seven lens elements of the photographing optical lens system; that is, each of the first through the seventh lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between every adjacent lens element of the seven lens elements of the photographing optical lens system in the present disclosure is favorable for preventing the problem associated with the cemented lens elements while improving the yield rate.

The first lens element can have an object-side surface being convex in a paraxial region thereof. Therefore, it is favorable for the photographing optical lens system to have a wider imaging range so as to provide a sufficient field of view.

The fourth lens element can have negative refractive power. Therefore, it is favorable for correcting aberrations such as chromatic aberration.

The fifth lens element can have negative refractive power. Therefore, it is favorable for correcting astigmatism.

The seventh lens element has an object-side surface being concave in a paraxial region thereof; therefore, it is favorable for the photographing optical lens system to be configured with a large aperture stop, and reducing the shape variation of the seventh lens element. The seventh lens element can have negative refractive power; therefore, it is favorable for balancing the refractive power distribution on the image side to correct aberrations, and reducing the back focal length to achieve compactness. The object-side surface of the seventh lens element can have at least one convex critical point in an off-axis region thereof; therefore, it is favorable for reducing the incident angle of peripheral light rays on the image surface so as to improve the response efficiency of an image sensor.

Figure 19:
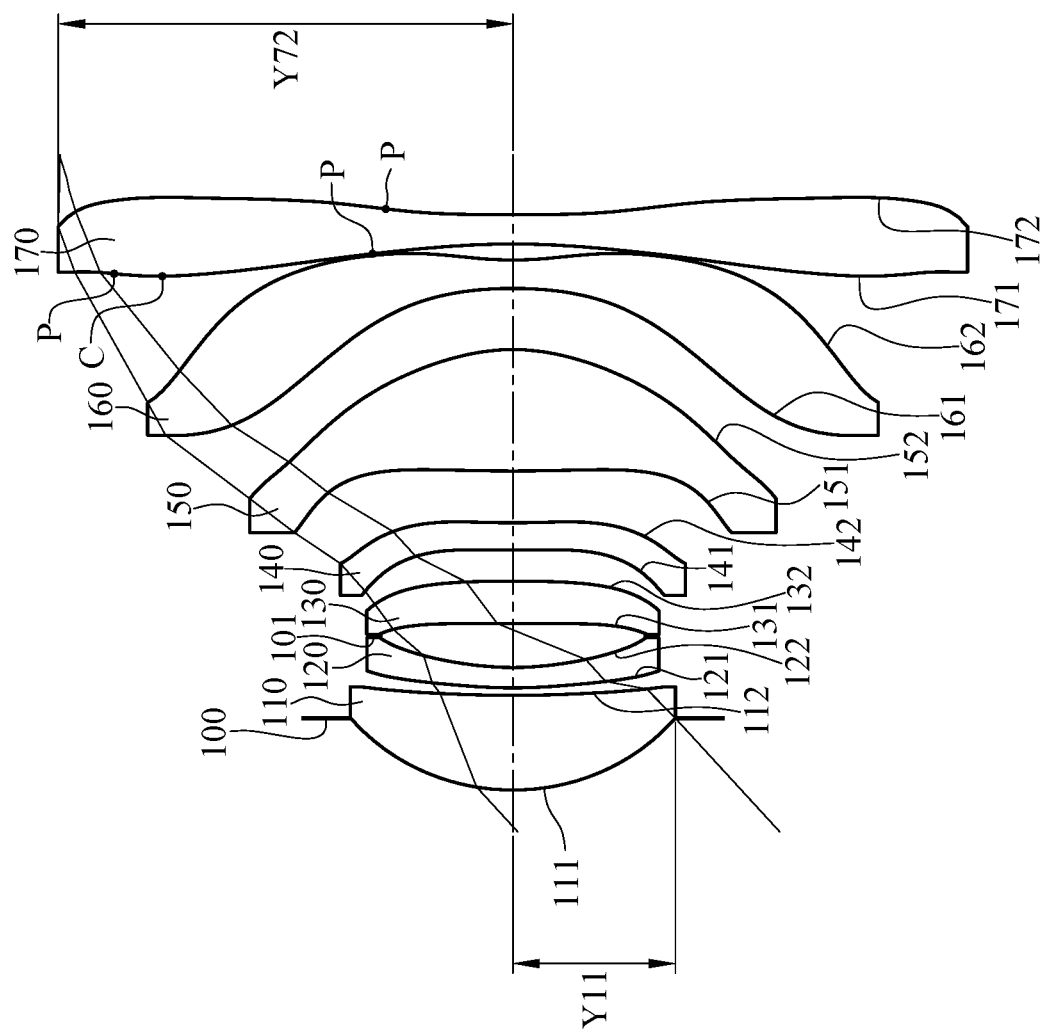
FIG. 19 shows a schematic view of Y11, Y72 and a critical point and inflection points of the seventh lens element according to the 1st embodiment of the present disclosure.

According to the present disclosure, at least one lens surface among the object-side surfaces and the image-side surfaces of the first lens element, the second lens element, the third lens element, the fourth lens element, the fifth lens element, the sixth lens element and the seventh lens element is aspheric and has at least one inflection point. Therefore, it is favorable for controlling peripheral light rays projecting on the image surface so as to prevent stray light due to an overly large incident angle; furthermore, it is favorable for reducing the incident angle in the off-axis region on the image surface so as to provide high illuminance and further improve the image quality. Preferably, each of at least two lens surfaces among all the lens surfaces of the seven lens elements can be aspheric and can have at least one inflection point. More preferably, each of at least three lens surfaces among all the lens surfaces of the seven lens elements can be aspheric and can have at least one inflection point. Please refer to FIG. 19, which shows a schematic view of inflection points P of the seventh lens element according to the 1st embodiment of the present disclosure. The inflection points P on the object-side surface and the image-side surface of the seventh lens element in FIG. 19 are only exemplary. The other lens surfaces of the seven lens elements may also have an inflection point.

According to the present disclosure, among all of the lens surfaces (the object-side surfaces and the image-side surfaces) of the seven lens elements, at least one lens surface can have at least one critical point in an off-axis region thereof, and the at least one critical point can be a convex critical point. Therefore, it is favorable for correcting off-axis aberrations and adjusting the incident angle and the refraction angle of peripheral light rays so as to prevent surface reflection and increase illuminance on the image surface, thereby eliminating vignetting and stray light. Preferably, at least one lens surface among all the lens surfaces of the fifth lens element, the sixth lens element and the seventh lens element can have at least one critical point in an off-axis region thereof. More preferably, at least one lens surface among all the lens surfaces of the sixth lens element and the seventh lens element can have at least one critical point in an off-axis region thereof. Please refer to FIG. 19, which shows a schematic view of a critical point C of the seventh lens element according to the 1st embodiment of the present disclosure. The convex critical point C on the object-side surface of the seventh lens element in FIG. 19 is only exemplary. The other lens surfaces of the seven lens elements may also have one or more critical points.

When an axial distance between the object-side surface of the first lens element and an image surface is TL, and a maximum image height of the photographing optical lens system (half of a diagonal length of an effective photosensitive area of an image sensor) is ImgH, the following condition is satisfied: TL/ImgH<1.75. Therefore, it is favorable for the miniaturization of the photographing optical lens system. Preferably, the following condition can be satisfied: TL/ImgH<1.55. More preferably, the following condition can be satisfied: 0.50<TL/ImgH<1.60. Much more preferably, the following condition can also be satisfied: 0.60<TL/ImgH≤1.50.

When a focal length of the photographing optical lens system is f, and an entrance pupil diameter of the photographing optical lens system is EPD, the following condition is satisfied: f/EPD<1.90. Therefore, it is favorable for the photographing optical lens system featuring a large aperture stop. Preferably, the following condition can also be satisfied: f/EPD≤1.70.

When the focal length of the photographing optical lens system is f, and a curvature radius of an image-side surface of the seventh lens element is R14, the following condition can be satisfied: f/R14≤0. Therefore, when configured with a concave shape in a paraxial region on the object-side surface of the seventh lens element, it is favorable for the photographing optical lens system to have a large aperture stop.

When the focal length of the photographing optical lens system is f, and a focal length of the second lens element is f2, the following condition can be satisfied: f/f2<0.70. Therefore, it is favorable for the refractive power distribution of lens elements so as to balance the refractive power distribution of the photographing optical lens system with a large aperture and wide field of view configuration.

When a central thickness of the seventh lens element is CT7, and a sum of central thicknesses of all lens elements of the photographing optical lens system is ΣCT, the following condition can be satisfied: 1.00<ΣCT/CT7<20.0. Therefore, it is favorable for preventing the central thickness of the seventh lens element from being overly thin so as to avoid an overly large ratio of the central thickness to the peripheral thickness of the seventh lens element, thereby ensuring high manufacturing yields of the lens element. Preferably, the following condition can also be satisfied: 1.00<ΣCT/CT7<15.0.

When the focal length of the photographing optical lens system is f, and a curvature radius of an image-side surface of the sixth lens element is R12, the following condition can be satisfied: 0≤f/R12. Therefore, adjusting both the shape and the refractive power of the sixth lens element is favorable for increasing the design flexibility of the photographing optical lens system.

When a focal length of the sixth lens element is f6, and a focal length of the seventh lens element is f7, the following condition can be satisfied: −1.20≤f6/f7<2.00. Therefore, it is favorable for providing a better refractive power distribution between the sixth lens element and the seventh lens element and balancing the image quality of the central and the peripheral regions. Preferably, the following condition can also be satisfied: −1.20≤f6/f7<0.90.

When a central thickness of the fourth lens element is CT4, and an axial distance between the third lens element and the fourth lens element is T34, the following condition can be satisfied: 0<CT4/T34<2.50. Therefore, it is favorable for providing sufficient distances between every adjacent lens element in the middle part of the photographing optical lens system, such that the fourth lens element and its adjacent lens elements are configured with proper lens shapes and refractive power.

When the focal length of the photographing optical lens system is f, and a focal length of the fourth lens element is f4, the following condition can be satisfied: −10.0<f4/f≤0. Therefore, it is favorable for providing the lens elements in the middle part of the photographing optical lens system with sufficient negative refractive power to balance the positive refractive power on the object side so as to correct aberrations.

When a curvature radius of the object-side surface of the first lens element is R1, and a curvature radius of the object-side surface of the seventh lens element is R13, the following condition can be satisfied: −8.0<R13/R1<0. Therefore, it is favorable for the seventh lens element to have the proper lens shape for a large aperture configuration while reducing the shape variation of the seventh lens element. Preferably, the following condition can be satisfied:

$-3.0<R13/R1<0$. More preferably, the following condition can also be satisfied: $-1.0<R13/R1<0$.

When the axial distance between the object-side surface of the first lens element and the image surface is TL, the following condition can be satisfied: 3.0 [mm]<TL<7.0 [mm]. Therefore, it is favorable for the miniaturization of the photographing optical lens system.

When half of a maximum field of view of the photographing optical lens system is HFOV, the following condition can be satisfied: 35.0 [deg.]<HFOV<65.0 [deg.]. Therefore, it is favorable for providing sufficient field of view with a large aperture stop.

According to the present disclosure, an axial distance between the sixth lens element and the seventh lens element T67 can be the largest among all axial distances between all adjacent lens elements of the photographing optical lens system. That is, the axial distance between the sixth lens element and the seventh lens element T67 can be larger than an axial distance between the first lens element and the second lens element T12, an axial distance between the second lens element and the third lens element T23, the axial distance between the third lens element and the fourth lens element T34, an axial distance between the fourth lens element and the fifth lens element T45, and an axial distance between the fifth lens element and the sixth lens element T56. Therefore, it is favorable for the sixth and the seventh lens elements to correct off-axis aberrations, and providing sufficient space between every adjacent lens element.

When a focal length of the first lens element is f1, and the focal length of the second lens element is f2, the following condition can be satisfied: $f2/f1<1.0$. Therefore, it is favorable for the positive refractive power arrangement on the object side so as to balance the refractive power distribution of the photographing optical lens system with a large aperture and wide field of view configuration.

When the focal length of the photographing optical lens system is f, and the focal length of the seventh lens element is f7, the following condition can be satisfied: $f/f7<-0.50$. Therefore, it is favorable for providing the seventh lens element with sufficient negative refractive power so as to move the exit pupil towards the object side and thereby achieve compactness. Preferably, the following condition can also be satisfied: $f/f7<-1.0$.

When a curvature radius of an object-side surface of the sixth lens element is R11, and the curvature radius of the image-side surface of the sixth lens element is R12, the following condition can be satisfied: $0.10<(R11+R12)/(R11-R12)$. Therefore, adjusting both the shape and the refractive power of the sixth lens element is favorable for preventing image correction problems due to large differences among the refractive power of lens elements on the image side of the photographing optical lens system.

When a number of lens elements having an Abbe number smaller than 20 among the seven lens elements is V20, the following condition can be satisfied: $2 \leq V20$. Therefore, it is favorable for correcting chromatic aberration so as to improve the image quality at the image periphery.

According to the present disclosure, an absolute value of the curvature radius of the object-side surface of the seventh lens element can be a minimum among absolute values of curvature radii of the lens surfaces of the seven lens elements (the object-side surface of the first lens element through the image-side surface of the seventh lens element). Therefore, it is favorable for providing a large aperture stop and reducing the shape variation of the seventh lens element.

When a maximum effective radius of the object-side surface of the first lens element is Y11, and a maximum effective radius of the image-side surface of the seventh lens element is Y72, the following condition can be satisfied: $0.10<Y11/Y72<0.60$. Therefore, it is favorable for having a proper size of the lens elements for compact electronic devices so as to prevent improper space utilization of the photographing optical lens system due to the first lens element being overly large, and prevent insufficient incident light for image clarity due to an overly small size of the seventh lens element.

When the focal length of the photographing optical lens system is f, and the axial distance between the sixth lens element and the seventh lens element is T67, the following condition can be satisfied: $f/T67<10.0$. Therefore, it is favorable for correcting off-axis aberrations of the sixth and the seventh lens elements, and providing sufficient space between all adjacent lens elements.

When the focal length of the photographing optical lens system is f, the entrance pupil diameter of the photographing optical lens system is EPD, the axial distance between the object-side surface of the first lens element and the image surface is TL, and the maximum image height of the photographing optical lens system is ImgH, the following condition can be satisfied: $1.50<f/EPD+TL/ImgH<3.30$. Therefore, it is favorable for balancing the miniaturization of the photographing optical lens system and a configuration with a large aperture stop.

According to the present disclosure, the aforementioned features and conditions can be utilized in numerous combinations so as to achieve corresponding effects.

According to the present disclosure, the lens elements of the photographing optical lens system can be made of either glass or plastic material. When the lens elements are made of glass material, the refractive power distribution of the photographing optical lens system may be more flexible. The glass lens element can either be made by grinding or molding. When the lens elements are made of plastic material, the manufacturing cost can be effectively reduced. Furthermore, surfaces of each lens element can be arranged to be aspheric, which allows for more control variables for eliminating aberrations thereof, the required number of the lens elements can be reduced, and the total track length of the photographing optical lens system can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the photographing optical lens system, based on the corresponding image sensor, can be flat or curved, especially a curved surface being concave facing towards the object side of the photographing optical lens system.

According to the present disclosure, an image correction unit, such as a field flattener, can be optionally disposed between the lens element closest to the image side of the photographing optical lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens system and thereby provides a wider field of view for the same.

According to the present disclosure, the photographing optical lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
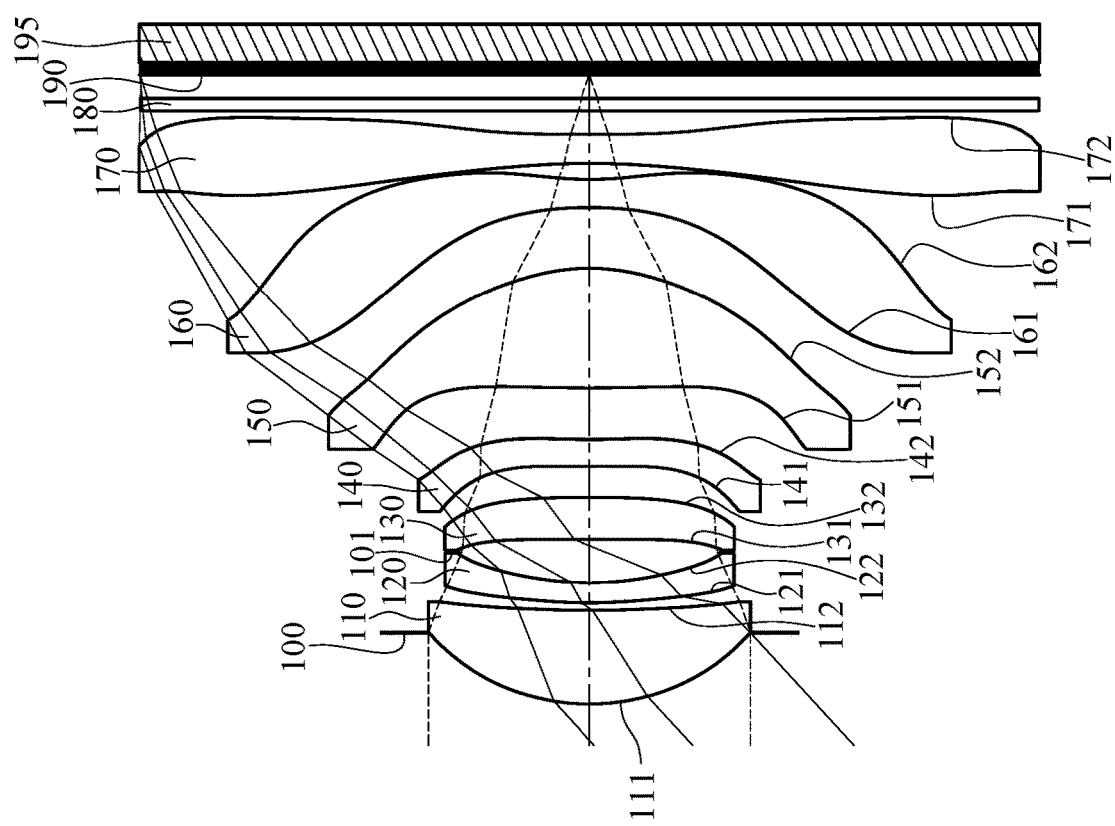
FIG. 1 is a schematic view of an image capturing unit according to the 1st embodiment of the present disclosure.
Figure 2:
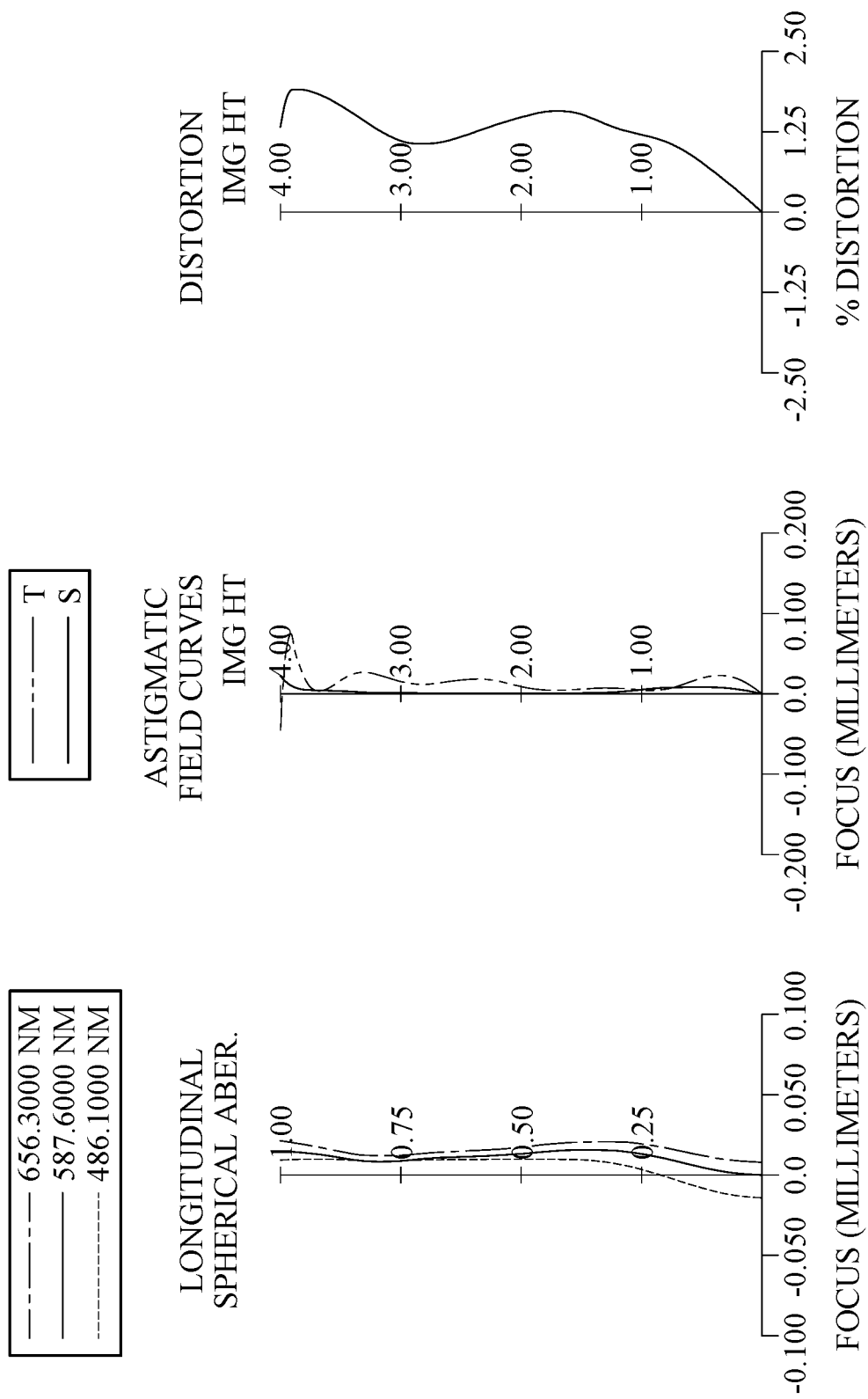
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 195. The photographing optical lens system includes, in order from an object side to an image side, an aperture stop 100, a first lens element 110, a second lens element 120, a stop 101, a third lens element 130, a fourth lens element 140, a fifth lens element 150, a sixth lens element 160, a seventh lens element 170, a filter 180 and an image surface 190. The photographing optical lens system includes seven single and non-cemented lens elements (110, 120, 130, 140, 150, 160 and 170) with no additional lens element disposed between each of the adjacent seven lens elements, wherein there is an air gap between every adjacent lens element.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has at least one critical point in an off-axis region thereof. The object-side surface 131 of the third lens element 130 has at least one inflection point.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Each of the object-side surface 141 and the image-side surface 142 of the fourth lens element 140 has at least one critical point in an off-axis region thereof. Each of the object-side surface 141 and the image-side surface 142 of the fourth lens element 140 has at least one inflection point.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one critical point in an off-axis region thereof. Each of the object-side surface 151 and the image-side surface 152 of the fifth lens element 150 has at least one inflection point.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one critical point in an off-axis region thereof. Each of the object-side surface 161 and the image-side surface 162 of the sixth lens element 160 has at least one inflection point.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has at least one critical point in an off-axis region thereof. Each of the object-side surface 171 and the image-side surface 172 of the seventh lens element 170 has at least one inflection point.

The filter 180 is made of glass material and located between the seventh lens element 170 and the image surface 190, and will not affect the focal length of the photographing optical lens system. The image sensor 195 is disposed on or near the image surface 190 of the photographing optical lens system.

The equation of the aspheric surface profiles of the aforementioned lens elements of the 1st embodiment is expressed as follows:

$$X(Y) = (Y^2/R)/(1+\operatorname{sqrt}(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=4.30 millimeters (mm), Fno=1.50, HFOV=42.5 degrees (deg.). In addition, when an entrance pupil diameter of the photographing optical lens system is EPD, Fno equals to f/EPD.

When an axial distance between the object-side surface 111 of the first lens element 110 and the image surface 190 is TL, the following condition is satisfied: TL=5.60 [mm].

When a number of lens elements having an Abbe number smaller than 20 among the first through the seventh lens elements is V20, the following condition is satisfied: V20=2. In detail, each of the second lens element 120 and the fourth lens element 140 has an Abbe number smaller than 20.

When the focal length of the photographing optical lens system is f, the entrance pupil diameter of the photographing optical lens system is EPD, the axial distance between the object-side surface 111 of the first lens element 110 and the image surface 190 is TL, and a maximum image height of the photographing optical lens system is ImgH, the following condition is satisfied: (f/EPD)+(TL/ImgH)=2.90.

When a central thickness of the fourth lens element 140 is CT4, and an axial distance between the third lens element 130 and the fourth lens element 140 is T34, the following condition is satisfied: CT4/T34=0.87. In this embodiment, an axial distance between two adjacent lens elements is an air gap in a paraxial region between the two adjacent lens elements.

When a sum of central thicknesses of all lens elements of the photographing optical lens system is ΣCT, and a central thickness of the seventh lens element 170 is CT7, the following condition is satisfied: ΣCT/CT7=12.35.

When the focal length of the photographing optical lens system is f, and an axial distance between the sixth lens element 160 and the seventh lens element 170 is T67, the following condition is satisfied: f/T67=30.26.

When the axial distance between the object-side surface 111 of the first lens element 110 and the image surface 190 is TL, and the maximum image height of the photographing optical lens system is ImgH, the following condition is satisfied: TL/ImgH=1.40.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.36.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=0.12.

When a curvature radius of the object-side surface 111 of the first lens element 110 is R1, and a curvature radius of the object-side surface 171 of the seventh lens element 170 is R13, the following condition is satisfied: R13/R1=−3.37.

When the focal length of the photographing optical lens system is f, and a curvature radius of the image-side surface 162 of the sixth lens element 160 is R12, the following condition is satisfied: f/R12=1.54.

When the focal length of the photographing optical lens system is f, and a curvature radius of the image-side surface 172 of the seventh lens element 170 is R14, the following condition is satisfied: f/R14=−0.04.

When a focal length of the first lens element 110 is f1, and a focal length of the second lens element 120 is f2, the following condition is satisfied: f2/f1=−2.66.

When the focal length of the photographing optical lens system is f, and a focal length of the fourth lens element 140 is f4, the following condition is satisfied: f4/f=−6.06.

When a focal length of the sixth lens element 160 is f6, and a focal length of the seventh lens element 170 is f7, the following condition is satisfied: f6/f7=0.21.

When the focal length of the photographing optical lens system is f, and the focal length of the second lens element 120 is f2, the following condition is satisfied: f/f2=−0.37.

When the focal length of the photographing optical lens system is f, and the focal length of the seventh lens element 170 is f7, the following condition is satisfied: f/f7=−0.33.

The detailed optical data of the 1st embodiment are shown in Table 1 and the aspheric surface data are shown in Table 2 below.

TABLE 1

1st Embodiment
f = 4.30 mm, Fno = 1.50, HFOV = 42.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.632 | | | | |

TABLE 1-continued

1st Embodiment
f = 4.30 mm, Fno = 1.50, HFOV = 42.5 deg.

| Surface # | | Curvature Radius | | Thickness | Material | Index | Abbe # | Focal Length |
|---|---|---|---|---|---|---|---|---|
| 2 | Lens 1 | 1.985 | (ASP) | 0.835 | Plastic | 1.545 | 56.1 | 4.40 |
| 3 | | 9.837 | (ASP) | 0.066 | | | | |
| 4 | Lens 2 | 4.076 | (ASP) | 0.180 | Plastic | 1.669 | 19.5 | −11.70 |
| 5 | | 2.633 | (ASP) | 0.278 | | | | |
| 6 | Stop | Plano | | 0.109 | | | | |
| 7 | Lens 3 | 55.793 | (ASP) | 0.374 | Plastic | 1.544 | 56.0 | 24.27 |
| 8 | | −17.254 | (ASP) | 0.275 | | | | |
| 9 | Lens 4 | 11.561 | (ASP) | 0.240 | Plastic | 1.669 | 19.5 | −26.03 |
| 10 | | 6.889 | (ASP) | 0.457 | | | | |
| 11 | Lens 5 | 15.018 | (ASP) | 1.071 | Plastic | 1.544 | 56.0 | 2.88 |
| 12 | | −1.706 | (ASP) | 0.539 | | | | |
| 13 | Lens 6 | −3.519 | (ASP) | 0.250 | Plastic | 1.544 | 56.0 | −2.82 |
| 14 | | 2.783 | (ASP) | 0.142 | | | | |
| 15 | Lens 7 | −6.694 | (ASP) | 0.260 | Plastic | 1.544 | 56.0 | −13.20 |
| 16 | | −99.785 | (ASP) | 0.208 | | | | |
| 17 | Filter | Plano | | 0.110 | Glass | 1.517 | 64.2 | — |
| 18 | | Plano | | 0.208 | | | | |
| 19 | Image | Plano | | — | | | | |

Note:
Reference wavelength is 587.6 nm (d-line).
An effective radius of the stop 101 (Surface 6) is 1.170 mm.
An effective radius of the object-side surface 151 (Surface 11) is 1.925 mm.

TABLE 2

Aspheric Coefficients

| Surface # | 2 | 3 | 4 | 5 | 7 |
|---|---|---|---|---|---|
| k= | −9.3218E−01 | 4.4987E+01 | 4.2613E+00 | 3.2516E−01 | 9.0000E+01 |
| A4= | 1.6901E−02 | −5.8882E−02 | −1.3850E−01 | −8.6356E−02 | −3.6472E−02 |
| A6= | 6.0885E−03 | 9.1523E−02 | 1.7652E−01 | 9.8411E−02 | −8.8810E−03 |
| A8= | −2.9226E−03 | −8.2180E−02 | −1.4674E−01 | −5.5600E−02 | 1.0449E−02 |
| A10= | 2.0802E−03 | 3.7155E−02 | 6.8142E−02 | 1.2391E−02 | −2.0478E−02 |
| A12= | −4.3651E−04 | −7.0292E−03 | −1.2451E−02 | 3.8958E−03 | 7.7560E−03 |

| Surface # | 8 | 9 | 10 | 11 | 12 |
|---|---|---|---|---|---|
| k= | −9.9000E+01 | 3.1207E+00 | 9.1149E+00 | 1.7836E+01 | −9.6798E+00 |
| A4= | −8.6631E−02 | −2.1782E−01 | −1.8712E−01 | −1.7613E−02 | −1.0984E−01 |
| A6= | 8.9209E−02 | 1.5355E−01 | 9.8817E−02 | −1.7720E−02 | 1.0441E−01 |
| A8= | −1.7657E−01 | −2.0585E−01 | −8.0340E−02 | 1.6610E−02 | −8.0119E−02 |
| A10= | 2.1393E−01 | 2.1111E−01 | 5.1194E−02 | −1.4044E−02 | 3.9062E−02 |
| A12= | −1.6631E−01 | −1.3933E−01 | −2.0396E−02 | 6.6455E−03 | −1.2214E−02 |
| A14= | 7.0137E−02 | 4.7123E−02 | 3.5442E−03 | −1.6462E−03 | 2.3582E−03 |
| A16= | −1.2165E−02 | −5.9268E−03 | — | 1.6128E−04 | −2.5061E−04 |
| A18= | — | — | — | — | 1.1043E−05 |

| Surface # | 13 | 14 | 15 | 16 |
|---|---|---|---|---|
| k= | −1.8270E−02 | −8.5870E+00 | −2.3146E+01 | −3.5495E−01 |
| A4= | −5.5684E−02 | −1.5307E−01 | 1.0595E−02 | 7.2566E−02 |
| A6= | 8.8187E−03 | 8.3107E−02 | −5.3967E−03 | −4.2920E−02 |
| A8= | 1.2970E−03 | −2.7748E−02 | 1.3939E−03 | 1.3009E−02 |
| A10= | −5.8907E−04 | 5.8788E−03 | −1.9527E−04 | −2.4397E−03 |
| A12= | 1.2397E−04 | −8.1295E−04 | 1.5272E−05 | 2.9795E−04 |
| A14= | −1.7584E−05 | 7.2678E−05 | −6.2167E−07 | −2.3674E−05 |
| A16= | 1.5239E−06 | −4.0785E−06 | 1.0196E−08 | 1.1754E−06 |
| A18= | −7.0260E−08 | 1.3449E−07 | — | −3.2999E−08 |
| A20= | 1.3093E−09 | −2.0734E−09 | — | 3.9854E−10 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
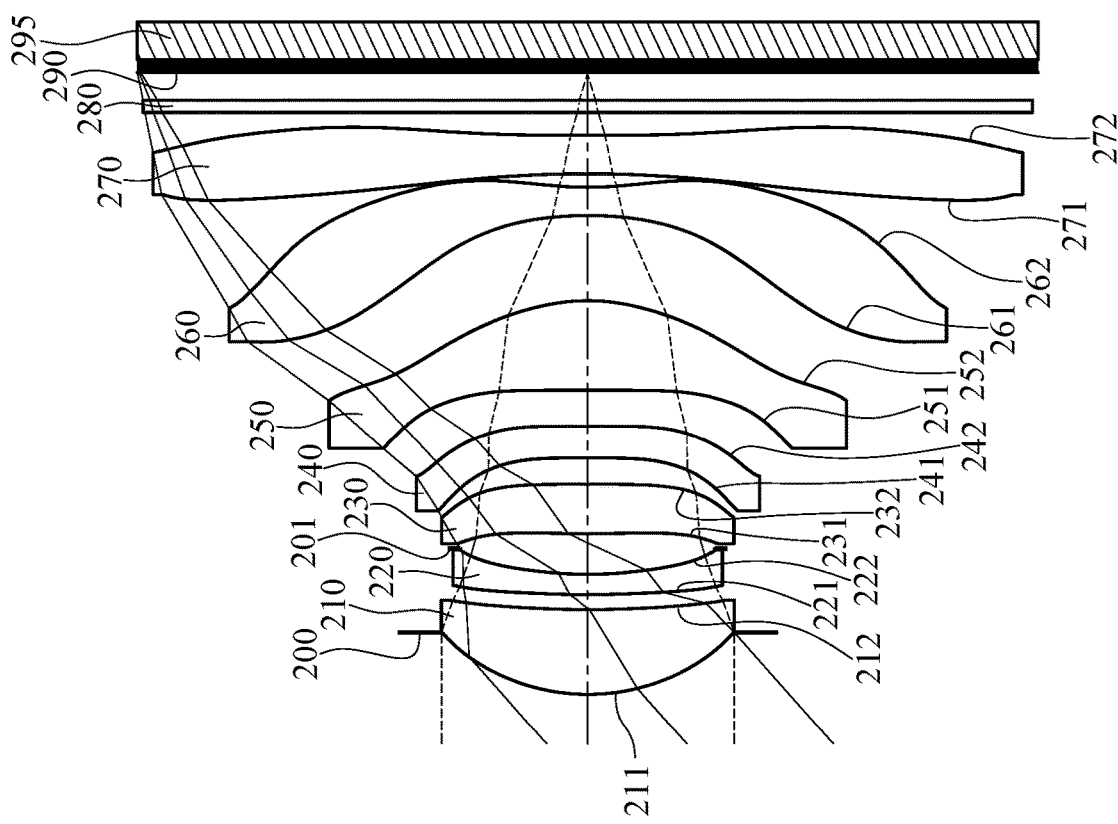
FIG. 3 is a schematic view of an image capturing unit according to the 2nd embodiment of the present disclosure.

FIG. 3 is a schematic view of an image capturing unit according to the 2nd embodiment of the present disclosure.

Figure 4:
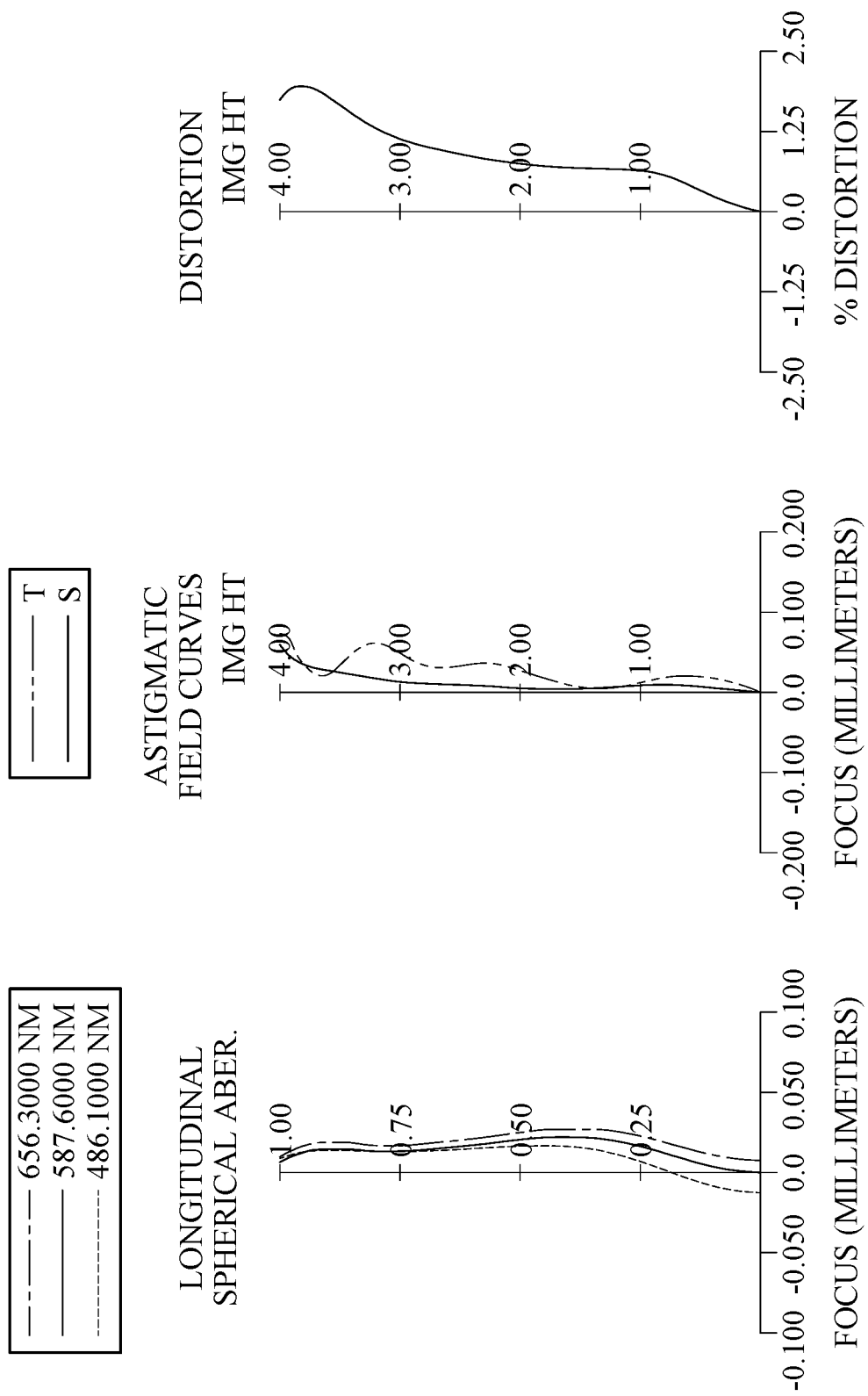
FIG. 4 shows spherical aberration curves, astigmatic field curves and a distortion curve of the image capturing unit according to the 2nd embodiment.

FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 295. The photographing optical lens system includes, in order from an object side to an image side, an aperture stop 200, a first lens element 210, a second lens element 220, a stop 201, a third lens element 230, a fourth lens element 240, a fifth lens element 250, a sixth lens element 260, a seventh lens element 270, a filter 280 and an image surface 290. The photographing optical lens system includes seven single and non-cemented lens elements (210, 220, 230, 240, 250, 260 and 270) with no additional lens element disposed between each of the adjacent seven lens elements, wherein there is an air gap between every adjacent lens element.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The image-side surface 212 of the first lens element 210 has at least one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one critical point in an off-axis region thereof. Each of the object-side surface 231 and the image-side surface 232 of the third lens element 230 has at least one inflection point.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one critical point in an off-axis region thereof. Each of the object-side surface 241 and the image-side surface 242 of the fourth lens element 240 has at least one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. Each of the object-side surface 251 and the image-side surface 252 of the fifth lens element 250 has at least one inflection point.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. Each of the object-side surface 261 and the image-side surface 262 of the sixth lens element 260 has at least one critical point in an off-axis region thereof. Each of the object-side surface 261 and the image-side surface 262 of the sixth lens element 260 has at least one inflection point.

The seventh lens element 270 with negative refractive power has an object-side surface 271 being concave in a paraxial region thereof and an image-side surface 272 being planar in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has at least one critical point in an off-axis region thereof. Each of the object-side surface 271 and the image-side surface 272 of the seventh lens element 270 has at least one inflection point.

The filter 280 is made of glass material and located between the seventh lens element 270 and the image surface 290, and will not affect the focal length of the photographing optical lens system. The image sensor 295 is disposed on or near the image surface 290 of the photographing optical lens system.

The detailed optical data of the 2nd embodiment are shown in Table 3 and the aspheric surface data are shown in Table 4 below.

TABLE 3

2nd Embodiment
f = 4.43 mm, Fno = 1.70, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.554 | | | | |
| 2 | Lens 1 | 1.887 | (ASP) | 0.756 | Plastic | 1.545 | 56.1 | 4.28 |
| 3 | | 8.455 | (ASP) | 0.134 | | | | |
| 4 | Lens 2 | 6.339 | (ASP) | 0.180 | Plastic | 1.669 | 19.5 | −10.84 |
| 5 | | 3.343 | (ASP) | 0.230 | | | | |
| 6 | Stop | Plano | | 0.133 | | | | |
| 7 | Lens 3 | 13.662 | (ASP) | 0.438 | Plastic | 1.544 | 56.0 | 29.03 |
| 8 | | 100.000 | (ASP) | 0.238 | | | | |
| 9 | Lens 4 | −100.000 | (ASP) | 0.282 | Plastic | 1.669 | 19.5 | −24.03 |
| 10 | | 19.171 | (ASP) | 0.326 | | | | |
| 11 | Lens 5 | −100.000 | (ASP) | 0.795 | Plastic | 1.544 | 56.0 | 3.25 |
| 12 | | −1.741 | (ASP) | 0.760 | | | | |
| 13 | Lens 6 | −3.457 | (ASP) | 0.251 | Plastic | 1.544 | 56.0 | −2.92 |
| 14 | | 3.008 | (ASP) | 0.119 | | | | |

TABLE 3-continued

2nd Embodiment
f = 4.43 mm, Fno = 1.70, HFOV = 41.5 deg.

| Surface # | | Curvature Radius | | Thickness | Material | Index | Abbe # | Focal Length |
|---|---|---|---|---|---|---|---|---|
| 15 | Lens 7 | −11.001 | (ASP) | 0.352 | Plastic | 1.544 | 56.0 | −20.22 |
| 16 | | ∞ | (ASP) | 0.201 | | | | |
| 17 | Filter | Plano | | 0.110 | Glass | 1.517 | 64.2 | — |
| 18 | | Plano | | 0.247 | | | | |
| 19 | Image | Plano | | — | | | | |

Note:
Reference wavelength is 587.6 nm (d-line).
An effective radius of the stop 201 (Surface 6) is 1.137 mm.

TABLE 4

Aspheric Coefficients

| Surface # | 2 | 3 | 4 | 5 | 7 |
|---|---|---|---|---|---|
| k= | −7.9312E−01 | 3.5350E+01 | 1.3223E+01 | 1.7904E+00 | 4.8154E+01 |
| A4= | 1.6728E−02 | −4.7339E−02 | −1.3213E−01 | −1.0050E−01 | −6.2913E−02 |
| A6= | 9.7564E−03 | 6.9092E−02 | 1.9658E−01 | 1.4201E−01 | −2.3552E−02 |
| A8= | −6.2510E−03 | −7.1821E−02 | −1.7810E−01 | −9.0291E−02 | 5.0269E−02 |
| A10= | 6.2952E−03 | 4.2419E−02 | 9.9620E−02 | 2.9920E−02 | −6.8330E−02 |
| A12= | −2.6554E−03 | −1.0729E−02 | −2.4130E−02 | 1.9594E−03 | 2.7743E−02 |
| A14= | 6.3797E−04 | — | — | — | — |

| Surface # | 8 | 9 | 10 | 11 | 12 |
|---|---|---|---|---|---|
| k= | 9.0000E+01 | −9.9000E+01 | 6.7456E+01 | −9.9000E+01 | −7.3131E+00 |
| A4= | −9.3497E−02 | −1.9034E−01 | −1.3826E−01 | 4.0047E−03 | −7.3076E−02 |
| A6= | 5.9074E−03 | 3.7716E−02 | −6.1229E−02 | −6.3253E−02 | 6.4516E−02 |
| A8= | −2.6226E−02 | −1.3306E−01 | 1.1407E−01 | 1.6560E−02 | −5.9984E−02 |
| A10= | 6.8440E−02 | 3.4398E−01 | −5.5864E−02 | 1.8844E−02 | 3.2083E−02 |
| A12= | −9.7584E−02 | −3.5860E−02 | 6.7538E−03 | −1.4739E−02 | −8.9707E−03 |
| A14= | 5.5326E−02 | 1.6278E−01 | 1.0804E−03 | 3.7796E−03 | 1.3322E−03 |
| A16= | −1.0528E−02 | −2.6755E−02 | — | −3.3304E−04 | −9.8299E−05 |
| A18= | — | — | — | — | 2.7096E−06 |

| Surface # | 13 | 14 | 15 | 16 |
|---|---|---|---|---|
| k= | −2.6210E−02 | −1.7055E+01 | −5.8306E+01 | 0.0000E+00 |
| A4= | −4.8120E−02 | −8.7843E−02 | −6.0267E−03 | 2.4525E−02 |
| A6= | −5.1982E−03 | 2.3081E−02 | 2.4362E−03 | −1.0178E−02 |
| A8= | 1.1054E−02 | −1.7279E−03 | −4.1038E−04 | 1.9981E−03 |
| A10= | −3.5140E−03 | −5.5234E−04 | 3.9810E−05 | −2.3942E−04 |
| A12= | 5.9907E−04 | 1.6933E−04 | −2.3628E−06 | 1.8366E−05 |
| A14= | −6.3272E−05 | −2.1071E−05 | 8.0768E−08 | −8.7571E−07 |
| A16= | 4.1628E−06 | 1.2996E−06 | −1.1742E−09 | 2.3227E−08 |
| A18= | −1.5642E−07 | −3.2046E−08 | — | −2.5437E−10 |
| A20= | 2.5575E−09 | — | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.43 | Y11/Y72 | 0.34 |
| f/EPD | 1.70 | (R11 + R12)/(R11 − R12) | 0.07 |
| HFOV [deg.] | 41.5 | R13/R1 | −5.83 |
| TL [mm] | 5.55 | f/R12 | 1.47 |
| V20 | 2 | f/R14 | 0.00 |

-continued

| 2nd Embodiment | | | |
|---|---|---|---|
| (f/EPD) + (TL/ImgH) | 3.09 | f2/f1 | −2.53 |
| CT4/T34 | 1.18 | f4/f | −5.42 |
| ΣCT/CT7 | 8.68 | f6/f7 | 0.14 |
| f/T67 | 37.24 | f/f2 | −0.41 |
| TL/ImgH | 1.39 | f/f7 | −0.22 |

3rd Embodiment

Figure 5:
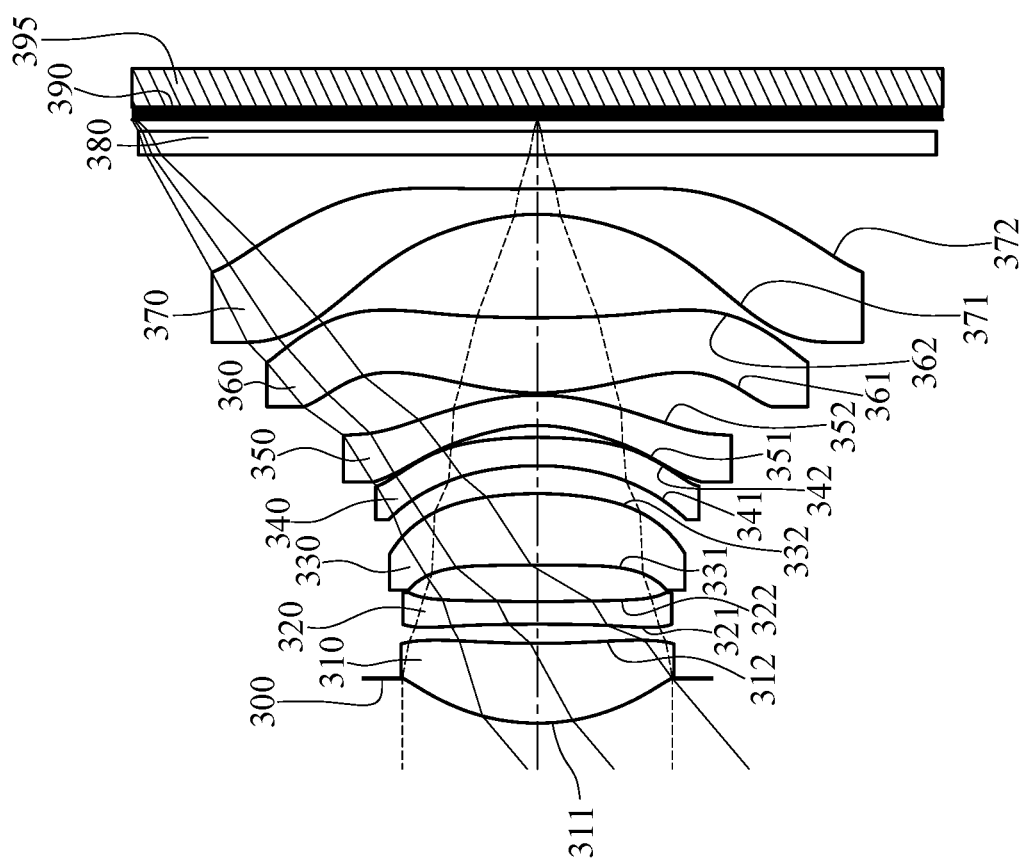
FIG. 5 is a schematic view of an image capturing unit according to the 3rd embodiment of the present disclosure.
Figure 6:
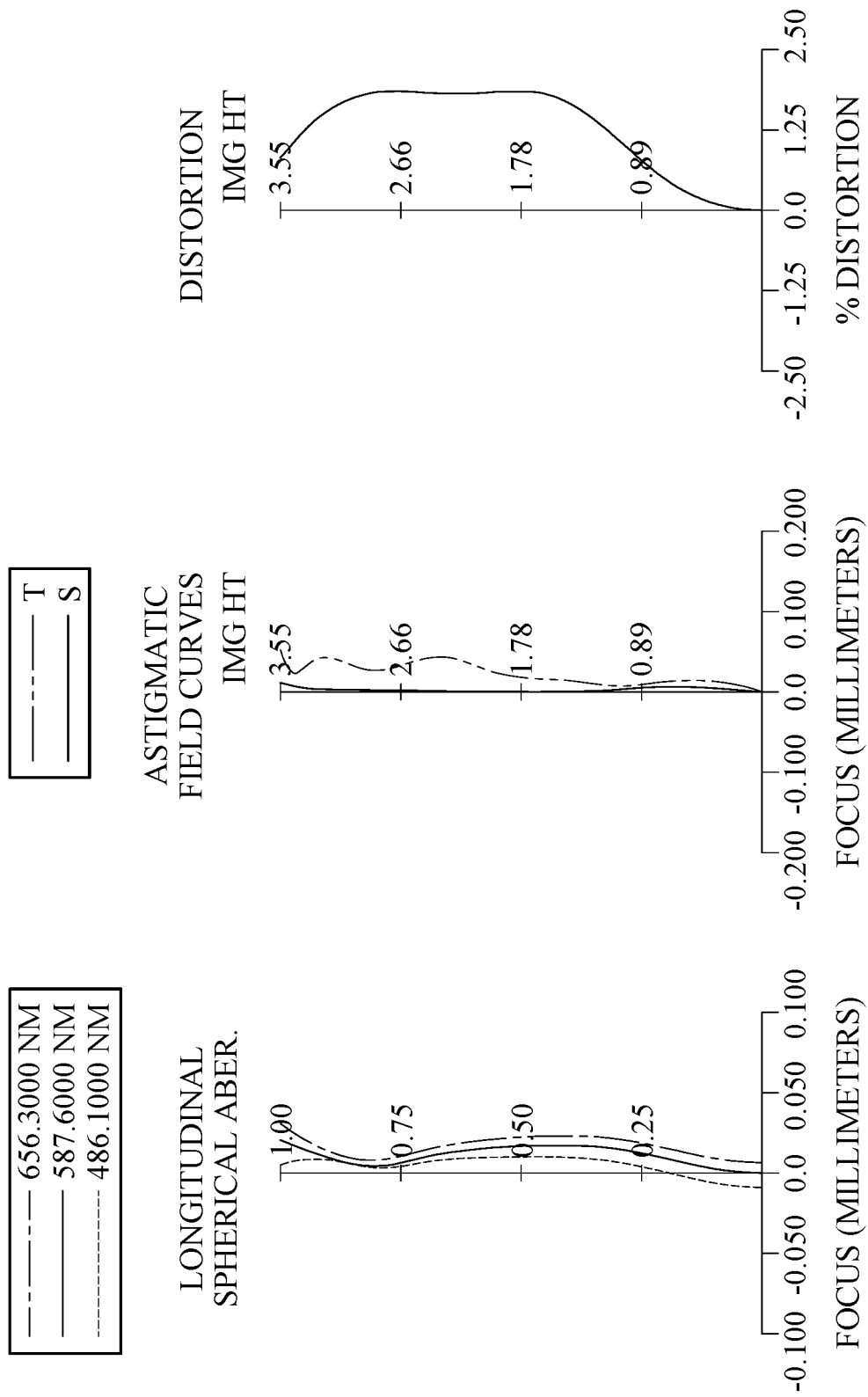
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 395. The photographing optical lens system includes, in order from an object side to an image side, an aperture stop 300, a first lens element 310, a second lens element 320, a third lens element 330, a fourth lens element 340, a fifth lens element 350, a sixth lens element 360, a seventh lens element 370, a filter 380 and an image surface 390. The photographing optical lens system includes seven single and non-cemented lens elements (310, 320, 330, 340, 350, 360 and 370) with no additional lens element disposed between each of the adjacent seven lens elements, wherein there is an air gap between every adjacent lens element.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has at least one critical point in an off-axis region thereof. Each of the object-side surface 311 and the image-side surface 312 of the first lens element 310 has at least one inflection point.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one critical point in an off-axis region thereof. The object-side surface 321 of the second lens element 320 has at least one inflection point.

The third lens element 330 with positive refractive power has an object-side surface 331 being planar in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has at least one inflection point.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. Each of the object-side surface 351 and the image-side surface 352 of the fifth lens element 350 has at least one inflection point.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has at least one critical point in an off-axis region thereof. Each of the object-side surface 361 and the image-side surface 362 of the sixth lens element 360 has at least one inflection point.

The seventh lens element 370 with negative refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric. The image-side surface 372 of the seventh lens element 370 has at least one critical point in an off-axis region thereof. Each of the object-side surface 371 and the image-side surface 372 of the seventh lens element 370 has at least one inflection point.

The filter 380 is made of glass material and located between the seventh lens element 370 and the image surface 390, and will not affect the focal length of the photographing optical lens system. The image sensor 395 is disposed on or near the image surface 390 of the photographing optical lens system.

The detailed optical data of the 3rd embodiment are shown in Table 5 and the aspheric surface data are shown in Table 6 below.

TABLE 5

3rd Embodiment
f = 4.17 mm, Fno = 1.75, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.395 | | | | |
| 2 | Lens 1 | 1.866 | (ASP) | 0.704 | Plastic | 1.545 | 56.1 | 4.28 |
| 3 | | 8.104 | (ASP) | 0.169 | | | | |
| 4 | Lens 2 | −37.180 | (ASP) | 0.200 | Plastic | 1.669 | 19.5 | −16.54 |
| 5 | | 15.781 | (ASP) | 0.320 | | | | |
| 6 | Lens 3 | ∞ | (ASP) | 0.632 | Plastic | 1.580 | 56.0 | 5.62 |
| 7 | | −3.260 | (ASP) | 0.246 | | | | |
| 8 | Lens 4 | −2.304 | (ASP) | 0.250 | Plastic | 1.669 | 19.5 | −8.63 |
| 9 | | −4.001 | (ASP) | 0.105 | | | | |
| 10 | Lens 5 | −1.364 | (ASP) | 0.267 | Plastic | 1.614 | 26.0 | −8.14 |
| 11 | | −2.015 | (ASP) | 0.020 | | | | |
| 12 | Lens 6 | 2.091 | (ASP) | 0.663 | Plastic | 1.582 | 30.2 | 3.97 |
| 13 | | 19.090 | (ASP) | 0.912 | | | | |
| 14 | Lens 7 | −1.837 | (ASP) | 0.223 | Plastic | 1.566 | 37.4 | −3.31 |
| 15 | | −100.000 | (ASP) | 0.300 | | | | |

TABLE 5-continued

3rd Embodiment
f = 4.17 mm, Fno = 1.75, HFOV = 40.1 deg.

| Surface # | | Curvature Radius | Thickness | Material | Index | Abbe # | Focal Length |
|---|---|---|---|---|---|---|---|
| 16 | Filter | Plano | 0.210 | Glass | 1.517 | 64.2 | — |
| 17 | | Plano | 0.100 | | | | |
| 18 | Image | Plano | — | | | | |

Note:
Reference wavelength is 587.6 nm (d-line).
An effective radius of the image-side surface 322 (Surface 5) is 1.130 mm.
An effective radius of the object-side surface 361 (Surface 12) is 2.060 mm.

TABLE 6

Aspheric Coefficients

| Surface # | 2 | 3 | 4 | 5 | 6 |
|---|---|---|---|---|---|
| k= | −2.4721E−01 | 1.9566E+01 | 9.0000E+01 | −9.0000E+01 | 0.0000E+00 |
| A4= | 9.6003E−05 | −3.2501E−02 | −6.0304E−02 | −4.0878E−02 | −5.1674E−02 |
| A6= | 1.8481E−02 | 1.2728E−03 | 5.6947E−02 | 4.0273E−02 | −9.9158E−02 |
| A8= | −3.5054E−02 | −1.6547E−02 | −2.5710E−02 | 1.0415E−02 | 1.7015E−01 |
| A10= | 3.0325E−02 | 8.3867E−03 | 1.6237E−02 | −1.4678E−02 | −2.5532E−01 |
| A12= | −1.2195E−02 | −2.6702E−03 | −1.2136E−03 | 1.0486E−02 | 1.7866E−01 |
| A14= | — | — | — | — | −5.0862E−02 |

| Surface # | 7 | 8 | 9 | 10 | 11 |
|---|---|---|---|---|---|
| k= | 3.1548E+00 | 1.6442E+00 | 5.3659E+00 | −4.7877E+00 | −6.3014E−01 |
| A4= | 2.2868E−02 | 1.2343E−01 | 5.7152E−03 | −1.3248E−02 | 2.2618E−02 |
| A6= | −1.4380E−01 | −3.2950E−01 | −3.3209E−02 | 2.0373E−01 | 1.0605E−01 |
| A8= | 1.3674E−01 | 3.6947E−01 | −1.4766E−01 | −4.9221E−01 | −1.3841E−01 |
| A10= | −9.8028E−02 | −1.7584E−01 | 2.1681E−01 | 4.2038E−01 | 7.8974E−02 |
| A12= | 4.4037E−02 | 2.1737E−02 | −1.0703E−01 | −1.5458E−01 | −2.0457E−02 |
| A14= | −9.2604E−03 | 5.1625E−03 | 1.9003E−02 | 2.1099E−02 | 1.9729E−03 |

| Surface # | 12 | 13 | 14 | 15 |
|---|---|---|---|---|
| k= | −1.6992E+01 | 4.4062E+01 | −6.6103E+00 | −9.0000E+01 |
| A4= | 3.5199E−02 | 5.4769E−02 | 1.2250E−02 | 6.4333E−02 |
| A6= | −4.8787E−02 | −4.0937E−02 | −6.9335E−02 | −8.2126E−02 |
| A8= | 1.8518E−02 | 7.0290E−03 | 3.9285E−02 | 4.3192E−02 |
| A10= | −5.0793E−03 | 1.9851E−03 | −1.2020E−02 | −1.4629E−02 |
| A12= | 6.5993E−04 | −1.5150E−03 | 2.4401E−03 | 3.2978E−03 |
| A14= | 1.9469E−05 | 3.9049E−04 | −3.2065E−04 | −4.8081E−04 |
| A16= | −7.4083E−06 | −4.7498E−05 | 2.4069E−05 | 4.3024E−05 |
| A18= | — | 2.2667E−06 | −7.7235E−07 | −2.1315E−06 |
| A20= | — | — | — | 4.4523E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.17 | Y11/Y72 | 0.42 |
| f/EPD | 1.75 | (R11 + R12)/(R11 − R12) | −1.25 |
| HFOV [deg.] | 40.1 | R13/R1 | −0.98 |
| TL [mm] | 5.32 | f/R12 | 0.22 |
| V20 | 2 | f/R14 | −0.04 |
| (f/EPD) + (TL/ImgH) | 3.25 | f2/f1 | −3.87 |
| CT4/T34 | 1.02 | f4/f | −2.07 |
| ΣCT/CT7 | 13.18 | f6/f7 | −1.20 |

-continued

| 3rd Embodiment | | | |
|---|---|---|---|
| f/T67 | 4.57 | f/f2 | −0.25 |
| TL/ImgH | 1.50 | f/f7 | −1.26 |

4th Embodiment

Figure 7:
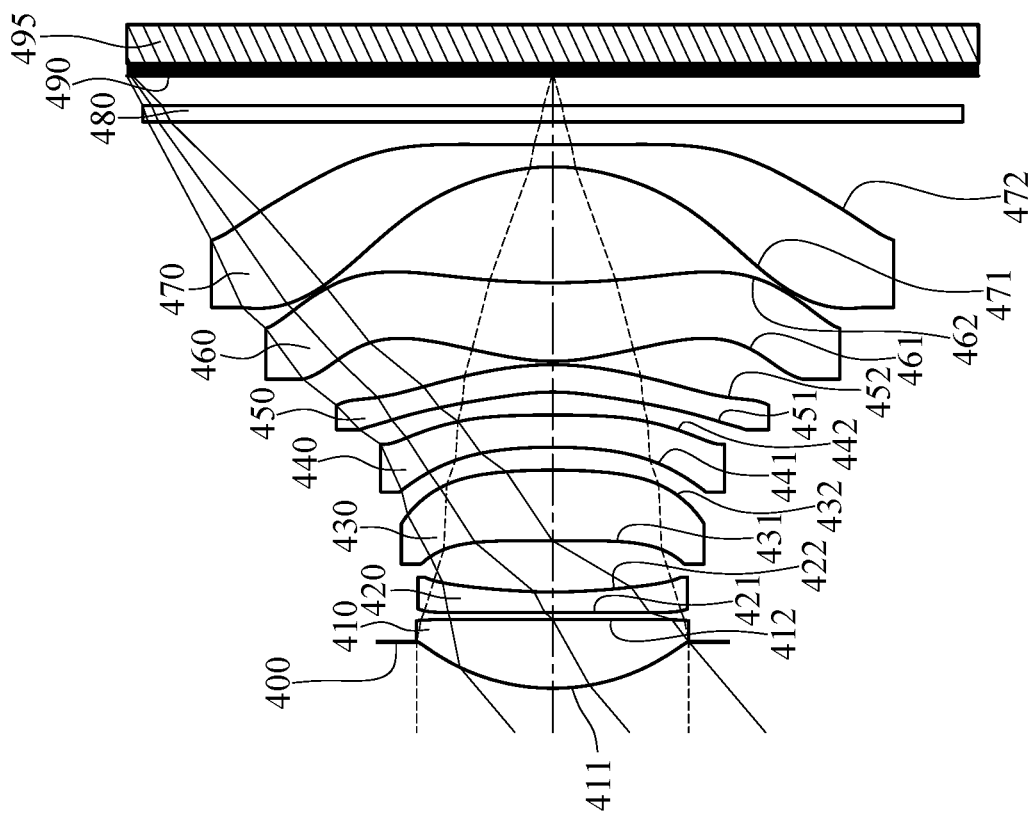
FIG. 7 is a schematic view of an image capturing unit according to the 4th embodiment of the present disclosure.
Figure 8:
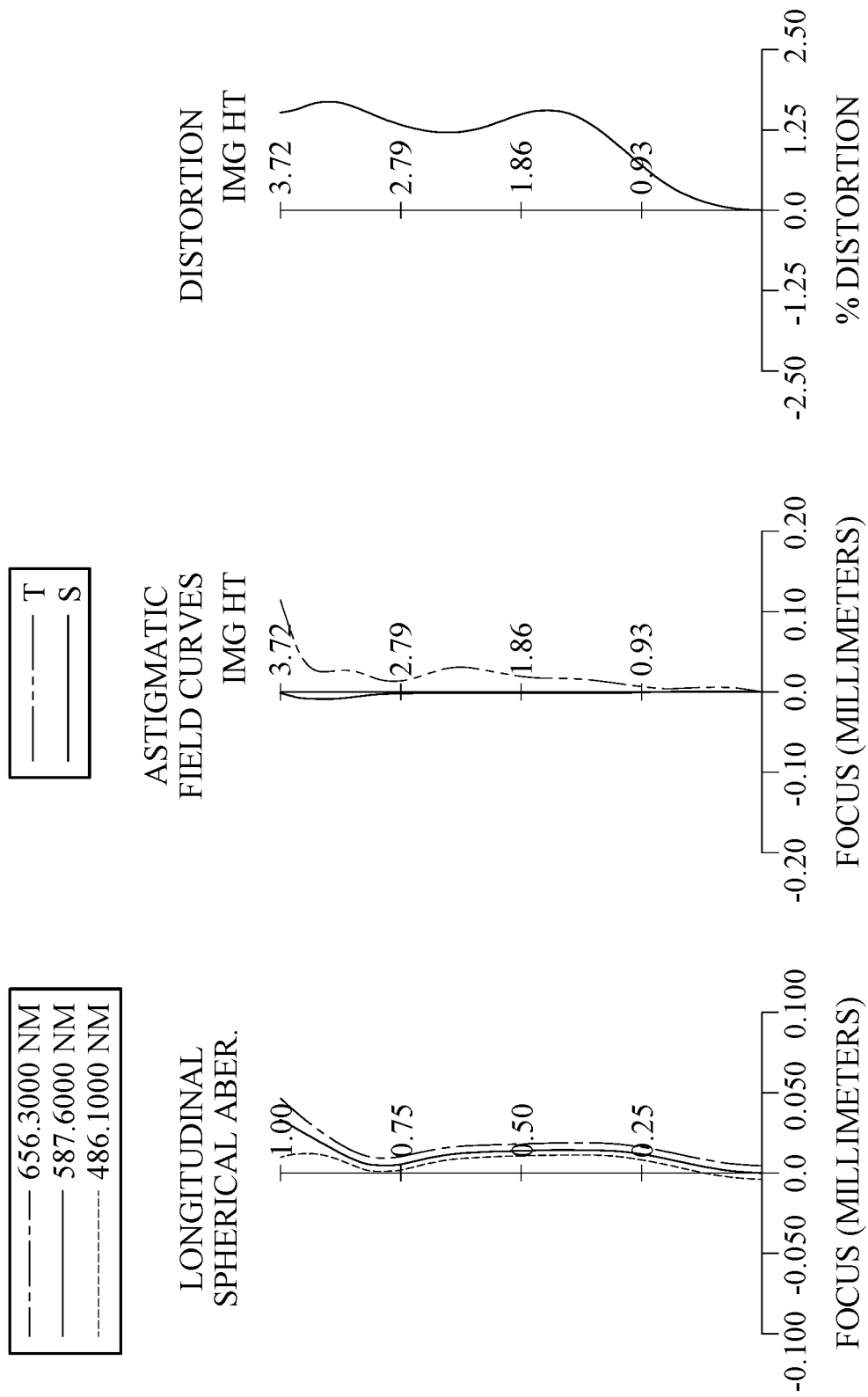
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system of the present disclosure and an image sensor 495. The photographing optical lens system includes, in order from an object side to an image side, an aperture stop 400, a first lens element 410, a second lens element 420, a third lens element 430, a fourth lens element 440, a fifth lens element 450, a sixth lens element 460, a seventh lens element 470, a filter 480 and an image surface 490. The photographing optical lens system includes seven single and non-cemented lens elements (410, 420, 430, 440, 450, 460 and 470) with no additional lens element disposed between each of the adjacent seven lens elements, wherein there is an air gap between every adjacent lens element.

The first lens element 410 with positive refractive power has an object-side surface 411 being convex in a paraxial region thereof and an image-side surface 412 being convex in a paraxial region thereof. The first lens element 410 is made of glass material and has the object-side surface 411 and the image-side surface 412 being both aspheric. The image-side surface 412 of the first lens element 410 has at least one critical point in an off-axis region thereof. Each of the object-side surface 411 and the image-side surface 412 of the first lens element 410 has at least one inflection point.

The second lens element 420 with negative refractive power has an object-side surface 421 being planar in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has at least one critical point in an off-axis region thereof. The object-side surface 421 of the second lens element 420 has at least one inflection point.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The image-side surface 442 of the fourth lens element 440 has at least one critical point in an off-axis region thereof. The image-side surface 442 of the fourth lens element 440 has at least one inflection point.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has at least one critical point in an off-axis region thereof. Each of the object-side surface 461 and the image-side surface 462 of the sixth lens element 460 has at least one inflection point.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has at least one critical point in an off-axis region thereof. Each of the object-side surface 471 and the image-side surface 472 of the seventh lens element 470 has at least one inflection point.

The filter 480 is made of glass material and located between the seventh lens element 470 and the image surface 490, and will not affect the focal length of the photographing optical lens system. The image sensor 495 is disposed on or near the image surface 490 of the photographing optical lens system.

The detailed optical data of the 4th embodiment are shown in Table 7 and the aspheric surface data are shown in Table 8 below.

TABLE 7

4th Embodiment
f = 4.31 mm, Fno = 1.80, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.411 | | | | |
| 2 | Lens 1 | 1.920 | (ASP) | 0.607 | Glass | 1.518 | 63.5 | 3.64 |
| 3 | | −86.485 | (ASP) | 0.063 | | | | |
| 4 | Lens 2 | ∞ | (ASP) | 0.180 | Plastic | 1.614 | 26.0 | −8.56 |
| 5 | | 5.254 | (ASP) | 0.453 | | | | |
| 6 | Lens 3 | −97.734 | (ASP) | 0.622 | Plastic | 1.544 | 56.0 | 11.12 |
| 7 | | −5.708 | (ASP) | 0.202 | | | | |
| 8 | Lens 4 | −4.338 | (ASP) | 0.284 | Plastic | 1.639 | 23.3 | −12.27 |
| 9 | | −9.959 | (ASP) | 0.202 | | | | |
| 10 | Lens 5 | −1.767 | (ASP) | 0.241 | Plastic | 1.544 | 56.0 | −10.98 |
| 11 | | −2.631 | (ASP) | 0.030 | | | | |
| 12 | Lens 6 | 1.660 | (ASP) | 0.693 | Plastic | 1.544 | 56.0 | 3.88 |
| 13 | | 6.659 | (ASP) | 1.022 | | | | |
| 14 | Lens 7 | −1.783 | (ASP) | 0.197 | Plastic | 1.544 | 56.0 | −3.38 |
| 15 | | −64.100 | (ASP) | 0.200 | | | | |

TABLE 7-continued

4th Embodiment
f = 4.31 mm, Fno = 1.80, HFOV = 40.3 deg.

| Surface # | | Curvature Radius | Thickness | Material | Index | Abbe # | Focal Length |
|---|---|---|---|---|---|---|---|
| 16 | Filter | Plano | 0.145 | Glass | 1.517 | 64.2 | — |
| 17 | | Plano | 0.260 | | | | |
| 18 | Image | Plano | — | | | | |

Note:
Reference wavelength is 587.6 nm (d-line).
An effective radius of the image-side surface 422 (Surface 5) is 1.130 mm.
An effective radius of the object-side surface 461 (Surface 12) is 2.200 mm.

TABLE 8

Aspheric Coefficients

| Surface # | 2 | 3 | 4 | 5 | 6 |
|---|---|---|---|---|---|
| k= | −3.7854E−01 | 9.0000E+01 | 0.0000E+00 | 1.6807E+01 | 9.0000E+01 |
| A4= | 3.3637E−03 | 1.6722E−02 | −3.3563E−03 | −3.4658E−02 | −4.6031E−02 |
| A6= | 2.9244E−02 | −6.0303E−03 | −6.4396E−03 | −4.4630E−03 | −6.7298E−02 |
| A8= | −4.7781E−02 | −5.7809E−03 | 1.0771E−02 | 1.4377E−02 | 9.1575E−02 |
| A10= | 4.4771E−02 | 5.1560E−04 | −1.0881E−02 | 4.1768E−03 | −1.4928E−01 |
| A12= | −1.6852E−02 | 1.7751E−04 | 9.2255E−03 | 1.6823E−03 | 1.1113E−01 |
| A14= | — | — | — | — | −3.1984E−02 |

| Surface # | 7 | 8 | 9 | 10 | 11 |
|---|---|---|---|---|---|
| k= | −5.3978E+00 | 3.6686E+00 | 1.0774E+01 | −2.1386E+01 | −3.2443E−01 |
| A4= | −1.5693E−02 | −8.0597E−03 | 2.6076E−02 | 1.2097E−01 | 4.0738E−02 |
| A6= | −8.8808E−02 | −1.5824E−01 | −2.5828E−01 | −2.6319E−01 | 9.0586E−03 |
| A8= | 5.3957E−02 | 2.3986E−01 | 3.2722E−01 | 2.5708E−01 | −2.2697E−02 |
| A10= | −4.9510E−02 | −1.9292E−01 | −1.9291E−01 | −1.3414E−01 | 1.3474E−02 |
| A12= | 3.2644E−02 | 8.1660E−02 | 5.4346E−02 | 3.5386E−02 | −3.0835E−03 |
| A14= | −8.3525E−03 | −1.3949E−02 | −5.6235E−03 | −3.6807E−03 | 2.3356E−04 |

| Surface # | 12 | 13 | 14 | 15 |
|---|---|---|---|---|
| k= | −1.6878E+01 | −8.8354E+01 | −4.9564E+00 | 8.3995E+01 |
| A4= | 1.8899E−02 | 3.4931E−02 | −8.4412E−03 | 4.0469E−02 |
| A6= | −3.0164E−02 | −2.7540E−02 | −3.9133E−02 | −5.2209E−02 |
| A8= | 1.1155E−02 | 6.2650E−03 | 1.7466E−02 | 2.4333E−02 |
| A10= | −3.3049E−03 | 4.7229E−06 | −2.9352E−03 | −7.3795E−03 |
| A12= | 4.3198E−04 | −5.1254E−04 | 1.9832E−04 | 1.5119E−03 |
| A14= | 1.2239E−05 | 1.5073E−04 | 1.5767E−06 | −1.9986E−04 |
| A16= | −4.3028E−06 | −1.8249E−05 | −8.4222E−07 | 1.6024E−05 |
| A18= | — | 8.2795E−07 | 2.8823E−08 | −7.0179E−07 |
| A20= | — | — | — | 1.2809E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.31 | Y11/Y72 | 0.40 |
| f/EPD | 1.80 | (R11 + R12)/(R11 − R12) | −1.66 |
| HFOV [deg.] | 40.3 | R13/R1 | −0.93 |
| TL [mm] | 5.40 | f/R12 | 0.65 |
| V20 | 0 | f/R14 | −0.07 |
| (f/EPD) + (TL/ImgH) | 3.25 | f2/f1 | −2.35 |
| CT4/T34 | 1.41 | f4/f | −2.85 |
| ΣCT/CT7 | 14.34 | f6/f7 | −1.15 |
| f/T67 | 4.22 | f/f2 | −0.50 |
| TL/ImgH | 1.45 | f/f7 | −1.28 |

5th Embodiment

Figure 9:
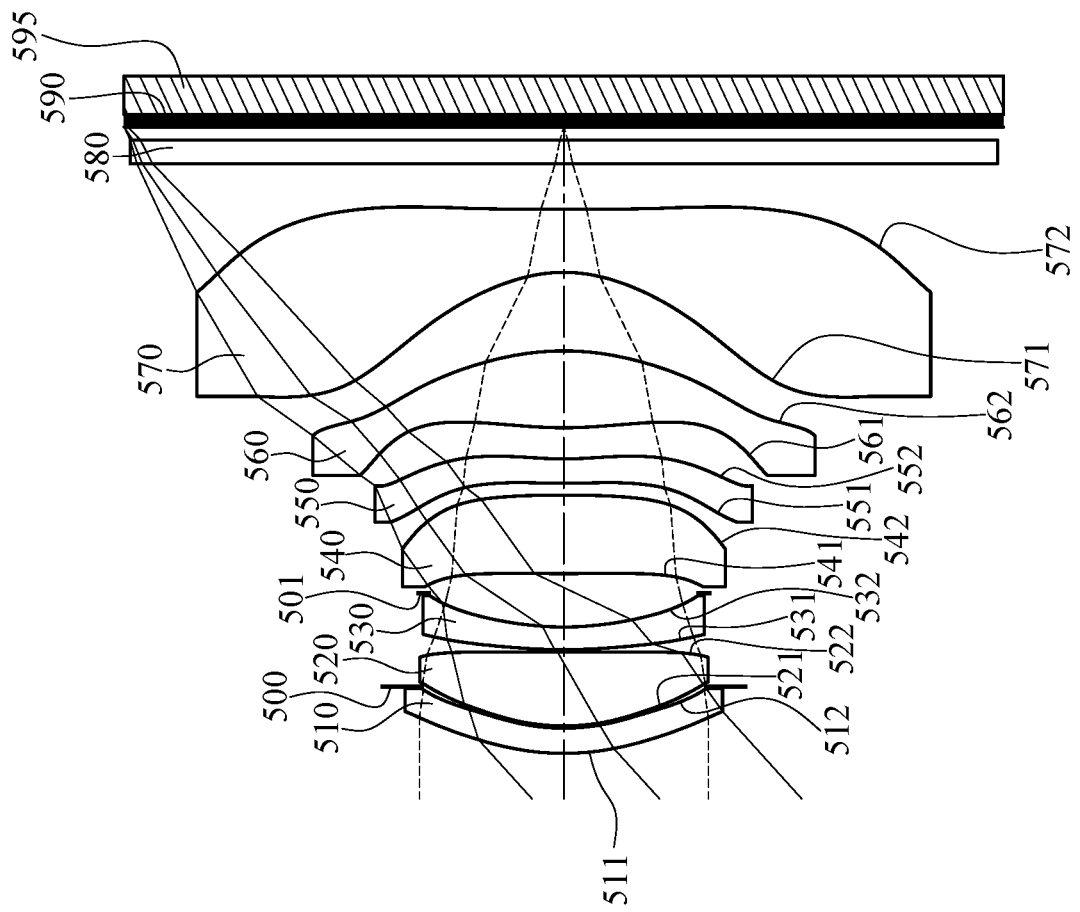
FIG. 9 is a schematic view of an image capturing unit according to the 5th embodiment of the present disclosure.
Figure 10:
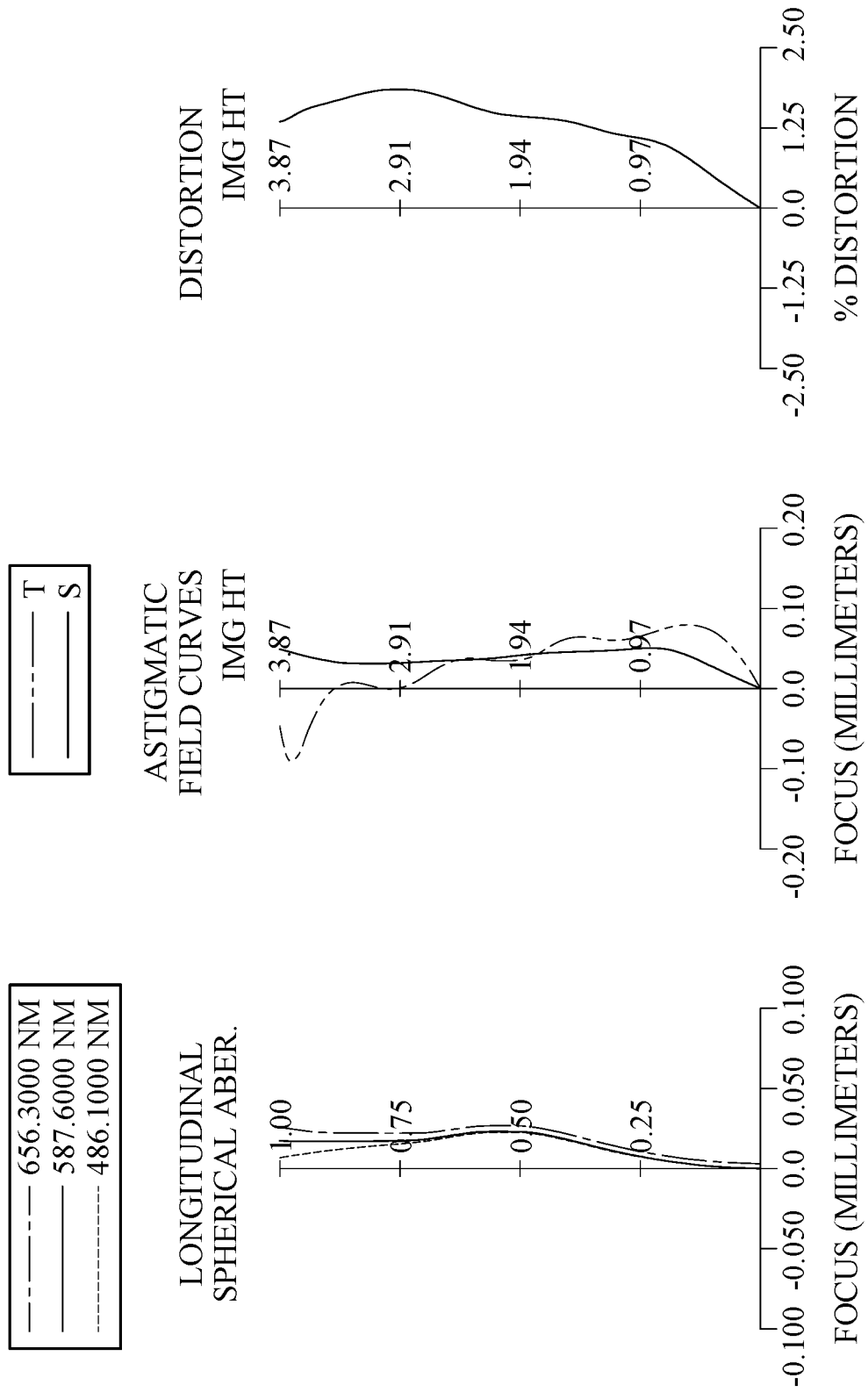
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 595. The photographing optical lens system includes, in order from an object side to an image side, a first lens element 510, an aperture stop 500, a second lens element 520, a third lens element 530, a stop 501, a fourth lens element 540, a fifth lens element 550, a sixth lens element 560, a seventh lens element 570, a filter 580 and an image surface 590. The photographing optical lens system includes seven single and non-cemented lens elements (510, 520, 530, 540, 550, 560 and 570) with no additional lens element disposed between each of the adjacent seven lens elements, wherein there is an air gap between every adjacent lens element.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric. The object-side surface 511 of the first lens element 510 has at least one inflection point.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The image-side surface 522 of the second lens element 520 has at least one critical point in an off-axis region thereof. The image-side surface 522 of the second lens element 520 has at least one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one critical point in an off-axis region thereof. The object-side surface 541 of the fourth lens element 540 has at least one inflection point.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. Each of the object-side surface 551 and the image-side surface 552 of the fifth lens element 550 has at least one critical point in an off-axis region thereof. Each of the object-side surface 551 and the image-side surface 552 of the fifth lens element 550 has at least one inflection point.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has at least one critical point in an off-axis region thereof. Each of the object-side surface 561 and the image-side surface 562 of the sixth lens element 560 has at least one inflection point.

The seventh lens element 570 with negative refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric. Each of the object-side surface 571 and the image-side surface 572 of the seventh lens element 570 has at least one critical point in an off-axis region thereof. Each of the object-side surface 571 and the image-side surface 572 of the seventh lens element 570 has at least one inflection point.

The filter 580 is made of glass material and located between the seventh lens element 570 and the image surface 590, and will not affect the focal length of the photographing optical lens system. The image sensor 595 is disposed on or near the image surface 590 of the photographing optical lens system.

The detailed optical data of the 5th embodiment are shown in Table 9 and the aspheric surface data are shown in Table 10 below.

TABLE 9

5th Embodiment
f = 4.20 mm, Fno = 1.65, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.220 | (ASP) | 0.223 | Glass | 1.518 | 63.5 | −47.72 |
| 2 | | 1.967 | (ASP) | 0.368 | | | | |
| 3 | Ape. Stop | Plano | | −0.348 | | | | |
| 4 | Lens 2 | 2.105 | (ASP) | 0.652 | Plastic | 1.580 | 60.0 | 3.55 |
| 5 | | −88.847 | (ASP) | 0.020 | | | | |
| 6 | Lens 3 | 4.882 | (ASP) | 0.200 | Plastic | 1.660 | 20.4 | −8.99 |
| 7 | | 2.635 | (ASP) | 0.299 | | | | |
| 8 | Stop | Plano | | 0.172 | | | | |
| 9 | Lens 4 | 40.986 | (ASP) | 0.692 | Plastic | 1.544 | 56.0 | 18.73 |
| 10 | | −13.477 | (ASP) | 0.104 | | | | |
| 11 | Lens 5 | 5.302 | (ASP) | 0.215 | Plastic | 1.639 | 23.3 | −9.14 |
| 12 | | 2.735 | (ASP) | 0.275 | | | | |
| 13 | Lens 6 | 3.476 | (ASP) | 0.678 | Plastic | 1.544 | 56.0 | 2.64 |
| 14 | | −2.277 | (ASP) | 0.693 | | | | |
| 15 | Lens 7 | −1.295 | (ASP) | 0.556 | Plastic | 1.544 | 56.0 | −2.42 |
| 16 | | −94.518 | (ASP) | 0.400 | | | | |

TABLE 9-continued

5th Embodiment
f = 4.20 mm, Fno = 1.65, HFOV = 42.2 deg.

| Surface # | | Curvature Radius | Thickness | Material | Index | Abbe # | Focal Length |
|---|---|---|---|---|---|---|---|
| 17 | Filter | Plano | 0.210 | Glass | 1.517 | 64.2 | — |
| 18 | | Plano | 0.114 | | | | |
| 19 | Image | Plano | — | | | | |

Note:
Reference wavelength is 587.6 nm (d-line).
An effective radius of the stop 501 (Surface 8) is 1.190 mm.
An effective radius of the object-side surface 571 (Surface 15) is 2.700 mm.

TABLE 10

Aspheric Coefficients

| Surface # | 1 | 2 | 4 | 5 | 6 |
|---|---|---|---|---|---|
| k= | −1.3356E+00 | −1.1231E+00 | −6.4903E−01 | 9.0000E+01 | 3.5390E+00 |
| A4= | −1.1345E−02 | 1.7958E−01 | 1.9327E−01 | 2.2674E−02 | −5.0684E−02 |
| A6= | −1.6780E−02 | −6.0687E−01 | −5.4247E−01 | −1.9034E−02 | 3.3768E−02 |
| A8= | 1.2248E−02 | 6.3537E−01 | 5.7693E−01 | −3.8041E−02 | −2.2594E−02 |
| A10= | −9.6986E−04 | −2.9060E−01 | −2.9149E−01 | 6.0765E−02 | 2.8853E−02 |
| A12= | −6.9569E−04 | 5.1565E−02 | 6.8848E−02 | −3.3834E−02 | −1.5589E−02 |
| A14= | — | — | −5.8392E−03 | 6.0853E−03 | 2.1898E−03 |

| Surface # | 7 | 9 | 10 | 11 | 12 |
|---|---|---|---|---|---|
| k= | 8.2037E−02 | 7.5211E+01 | −9.0000E+01 | −9.0000E+01 | −3.4799E+01 |
| A4= | −7.1468E−02 | −2.0049E−02 | −1.0545E−01 | −3.7879E−01 | −3.1526E−01 |
| A6= | 7.8262E−02 | −1.4623E−02 | 1.8977E−01 | 7.3265E−01 | 4.8331E−01 |
| A8= | −4.1416E−02 | −4.7132E−02 | −3.3628E−01 | −9.8539E−01 | −5.5387E−01 |
| A10= | 1.9664E−02 | 8.2953E−02 | 2.5881E−01 | 7.4928E−01 | 3.8201E−01 |
| A12= | −3.4925E−03 | −6.2951E−02 | −1.0424E−01 | −3.2517E−01 | −1.5185E−01 |
| A14= | — | 1.6750E−02 | 2.0817E−02 | 7.6734E−02 | 3.2148E−02 |
| A16= | — | — | −1.5418E−03 | −7.6648E−03 | −2.7776E−03 |

| Surface # | 13 | 14 | 15 | 16 |
|---|---|---|---|---|
| k= | −9.0000E+01 | −9.4525E+00 | −3.0867E+00 | −8.7925E+01 |
| A4= | 3.4152E−02 | −5.3366E−02 | −1.3494E−02 | 4.3757E−02 |
| A6= | −1.7188E−01 | 1.9585E−02 | −1.6931E−02 | −3.4982E−02 |
| A8= | 2.5490E−01 | 1.8140E−02 | 2.2061E−03 | 1.2851E−02 |
| A10= | −2.3927E−01 | −3.3922E−02 | 3.8597E−03 | −2.8612E−03 |
| A12= | 1.3299E−01 | 1.9523E−02 | −1.5352E−03 | 3.9825E−04 |
| A14= | −4.2974E−02 | −5.2589E−03 | 2.4385E−04 | −3.4022E−05 |
| A16= | 7.4180E−03 | 6.8482E−04 | −1.8264E−05 | 1.6269E−06 |
| A18= | −5.2393E−04 | −3.5005E−05 | 5.3520E−07 | −3.3116E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.20 | Y11/Y72 | 0.43 |
| f/EPD | 1.65 | (R11 + R12)/(R11 − R12) | 0.21 |
| HFOV [deg.] | 42.2 | R13/R1 | −0.58 |
| TL [mm] | 5.52 | f/R12 | −1.85 |
| V20 | 0 | f/R14 | −0.04 |
| (f/EPD) + (TL/ImgH) | 3.08 | f2/f1 | −0.07 |
| CT4/T34 | 1.47 | f4/f | 4.46 |
| ΣCT/CT7 | 5.78 | f6/f7 | −1.09 |
| f/T67 | 6.06 | f/f2 | 1.18 |
| TL/ImgH | 1.43 | f/f7 | −1.74 |

6th Embodiment

Figure 11:
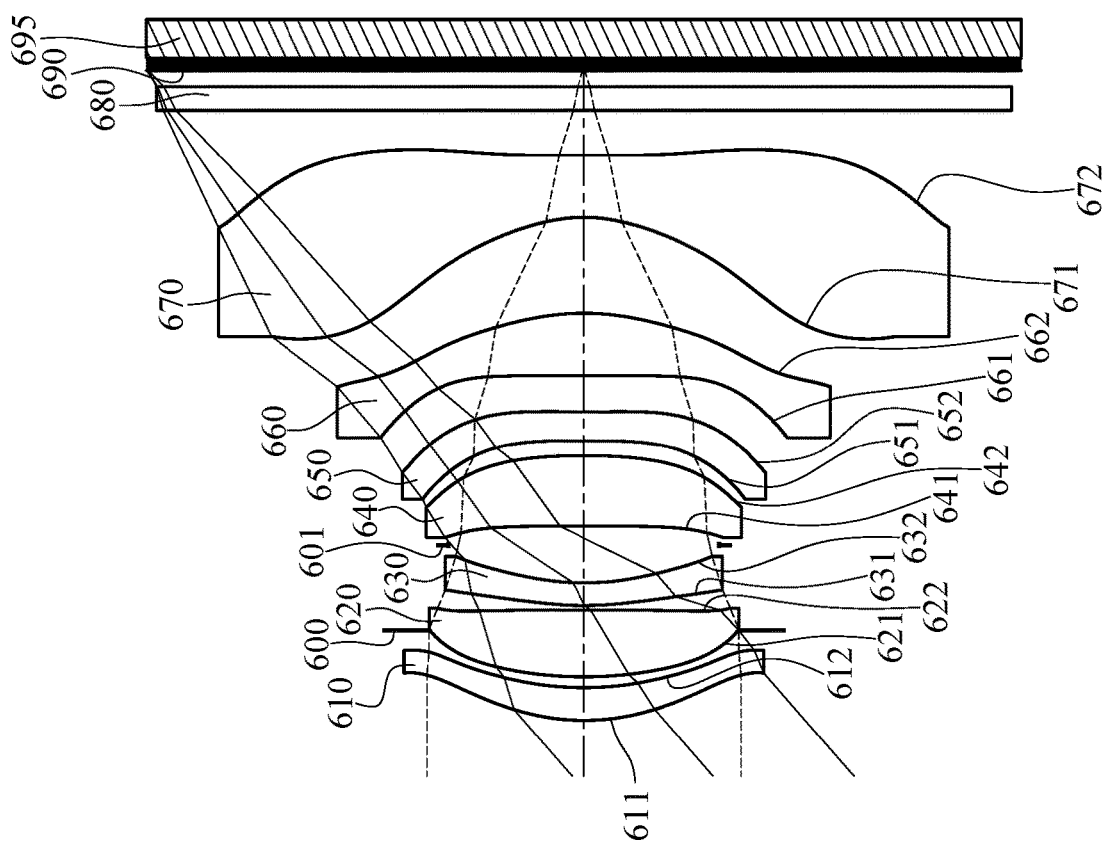
FIG. 11 is a schematic view of an image capturing unit according to the 6th embodiment of the present disclosure.
Figure 12:
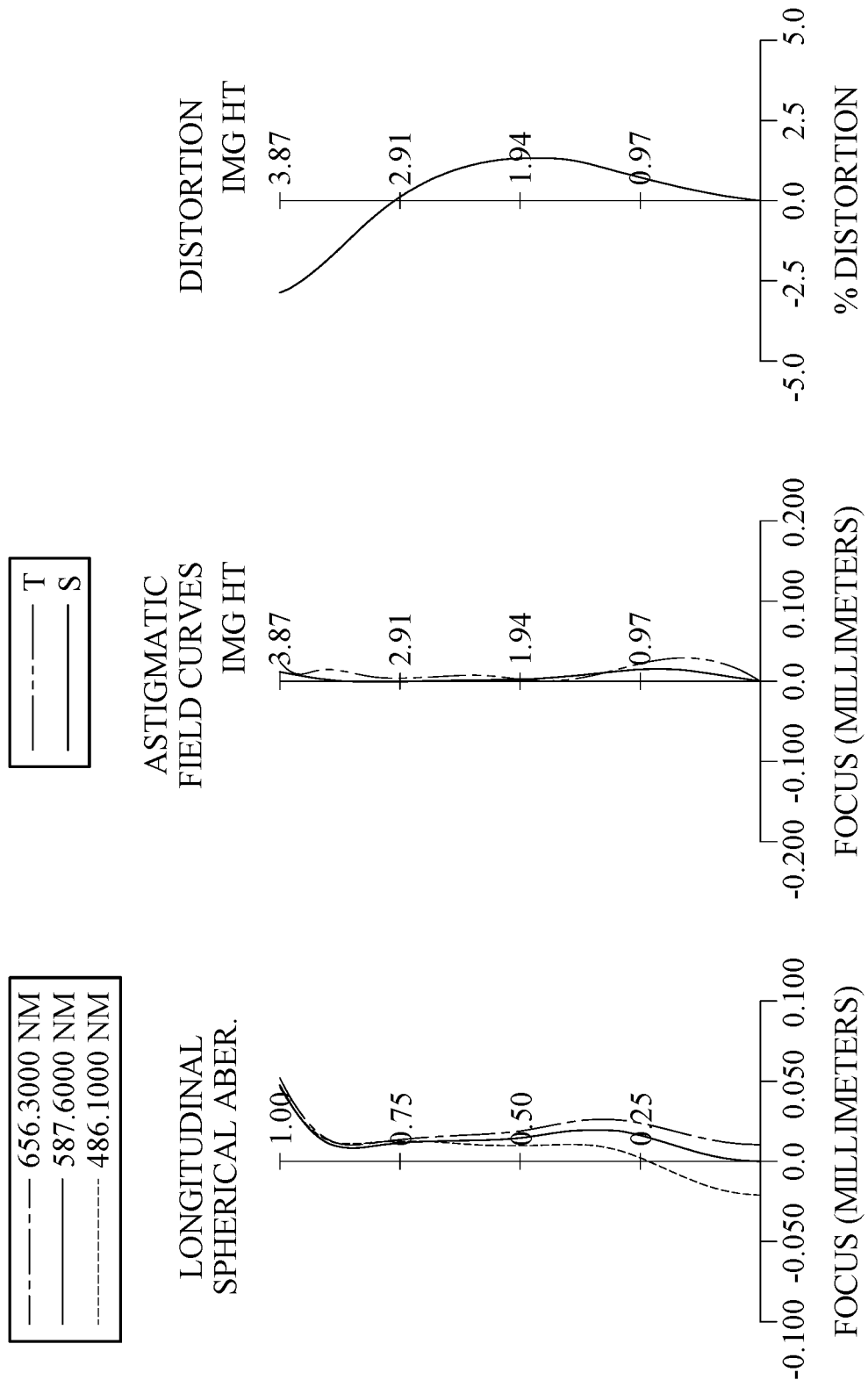
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 695. The photographing optical lens system includes, in order from an object side to an image side, a first lens element 610, an aperture stop 600, a second lens element 620, a third lens element 630, a stop 601, a fourth lens element 640, a fifth lens element 650, a sixth lens element 660, a seventh lens element 670, a filter 680 and an image surface 690. The photographing optical lens system includes seven single and non-cemented lens elements (610, 620, 630, 640, 650, 660 and 670) with no additional lens element disposed between each of the adjacent seven lens elements, wherein there is an air gap between every adjacent lens element.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. Each of the object-side surface 611 and the image-side surface 612 of the first lens element 610 has at least one critical point in an off-axis region thereof. Each of the object-side surface 611 and the image-side surface 612 of the first lens element 610 has at least one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The image-side surface 622 of the second lens element 620 has at least one critical point in an off-axis region thereof. The image-side surface 622 of the second lens element 620 has at least one inflection point.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one inflection point.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. Each of the object-side surface 641 and the image-side surface 642 of the fourth lens element 640 has at least one inflection point.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The image-side surface 662 of the sixth lens element 660 has at least one inflection point.

The seventh lens element 670 with negative refractive power has an object-side surface 671 being concave in a paraxial region thereof and an image-side surface 672 being convex in a paraxial region thereof. The seventh lens element 670 is made of plastic material and has the object-side surface 671 and the image-side surface 672 being both aspheric. Each of the object-side surface 671 and the image-side surface 672 of the seventh lens element 670 has at least one critical point in an off-axis region thereof. Each of the object-side surface 671 and the image-side surface 672 of the seventh lens element 670 has at least one inflection point.

The filter 680 is made of glass material and located between the seventh lens element 670 and the image surface 690, and will not affect the focal length of the photographing optical lens system. The image sensor 695 is disposed on or near the image surface 690 of the photographing optical lens system.

The detailed optical data of the 6th embodiment are shown in Table 11 and the aspheric surface data are shown in Table 12 below.

TABLE 11

6th Embodiment
f = 4.59 mm, Fno = 1.65, HFOV = 40.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.038 | (ASP) | 0.290 | Plastic | 1.515 | 56.5 | 12.80 |
| 2 | | 2.809 | (ASP) | 0.505 | | | | |
| 3 | Ape. Stop | Plano | | −0.409 | | | | |
| 4 | Lens 2 | 3.710 | (ASP) | 0.591 | Plastic | 1.544 | 55.9 | 7.07 |
| 5 | | 100.000 | (ASP) | 0.040 | | | | |
| 6 | Lens 3 | 2.869 | (ASP) | 0.200 | Plastic | 1.688 | 18.7 | −14.18 |
| 7 | | 2.154 | (ASP) | 0.337 | | | | |
| 8 | Stop | Plano | | 0.168 | | | | |
| 9 | Lens 4 | −100.000 | (ASP) | 0.622 | Plastic | 1.544 | 55.9 | 11.47 |
| 10 | | −5.883 | (ASP) | 0.135 | | | | |
| 11 | Lens 5 | −43.646 | (ASP) | 0.259 | Plastic | 1.688 | 18.7 | −15.88 |
| 12 | | 14.612 | (ASP) | 0.323 | | | | |
| 13 | Lens 6 | −100.000 | (ASP) | 0.549 | Plastic | 1.559 | 40.4 | 3.90 |
| 14 | | −2.135 | (ASP) | 0.850 | | | | |
| 15 | Lens 7 | −1.369 | (ASP) | 0.550 | Plastic | 1.515 | 56.5 | −2.70 |
| 16 | | −94.518 | (ASP) | 0.400 | | | | |

TABLE 11-continued

6th Embodiment
f = 4.59 mm, Fno = 1.65, HFOV = 40.9 deg.

| Surface # | | Curvature Radius | Thickness | Material | Index | Abbe # | Focal Length |
|---|---|---|---|---|---|---|---|
| 17 | Filter | Plano | 0.210 | Glass | 1.517 | 64.2 | — |
| 18 | | Plano | 0.145 | | | | |
| 19 | Image | Plano | — | | | | |

Note:
Reference wavelength is 587.6 nm id-line).
An effective radius of the stop 601 (Surface 8) is 1.200 mm.
An effective radius of the object-side surface 671 (Surface 15) is 2.770 mm.

TABLE 12

Aspheric Coefficients

| Surface # | 1 | 2 | 4 | 5 | 6 |
|---|---|---|---|---|---|
| k= | −1.5255E+00 | −2.8739E−01 | 3.2293E+00 | 9.0000E+01 | −9.3124E+00 |
| A4= | 2.4375E−02 | 2.1496E−02 | 2.8525E−02 | −7.1633E−02 | −1.1444E−01 |
| A6= | −6.4325E−02 | −1.1489E−01 | −1.1571E−01 | 1.4785E−01 | 1.6439E−01 |
| A8= | 1.3577E−01 | 2.4070E−01 | 2.9073E−01 | −1.3185E−01 | −1.2848E−01 |
| A10= | −2.0912E−01 | −3.9367E−01 | −5.2434E−01 | −8.0159E−02 | −3.2800E−02 |
| A12= | 1.9944E−01 | 4.4829E−01 | 6.5872E−01 | 3.6244E−01 | 1.9740E−01 |
| A14= | −1.1761E−01 | −3.0810E−01 | −5.1295E−01 | −4.3648E−01 | −2.1717E−01 |
| A16= | 4.1097E−02 | 1.2042E−01 | 2.3774E−01 | 2.7175E−01 | 1.2176E−01 |
| A18= | −7.7700E−03 | −2.4831E−02 | −6.0799E−02 | −8.8005E−02 | −3.5138E−02 |
| A20= | 6.1241E−04 | 2.1114E−03 | 6.6943E−03 | 1.1766E−02 | 3.9975E−03 |

| Surface # | 7 | 9 | 10 | 11 | 12 |
|---|---|---|---|---|---|
| k= | −1.8988E+00 | −1.4824E+01 | −7.0942E−01 | −1.0000E+00 | −9.0000E+01 |
| A4= | −7.8298E−02 | −3.6794E−02 | −1.0256E−01 | −2.5915E−01 | −2.0297E−01 |
| A6= | 2.1605E−03 | 1.0879E−01 | 1.7672E−01 | 5.1555E−01 | 3.4552E−01 |
| A8= | 2.4798E−01 | −4.5555E−01 | −4.1962E−01 | −1.1949E+00 | −6.9607E−01 |
| A10= | −6.2416E−01 | 9.9851E−01 | 5.2318E−01 | 1.6884E+00 | 8.4270E−01 |
| A12= | 8.5683E−01 | −1.3772E+00 | −3.6216E−01 | −1.4711E+00 | −6.2519E−01 |
| A14= | −7.1472E−01 | 1.2060E+00 | 1.2232E−01 | 8.0759E−01 | 2.9160E−01 |
| A16= | 3.5944E−01 | −6.5403E−01 | −5.5674E−03 | −2.7490E−01 | −8.4071E−02 |
| A18= | −9.8634E−02 | 2.0073E−01 | −7.8516E−03 | 5.3436E−02 | 1.3702E−02 |
| A20= | 1.1116E−02 | −2.6444E−02 | 1.5949E−03 | −4.5682E−03 | −9.5929E−04 |

| Surface # | 13 | 14 | 15 | 16 |
|---|---|---|---|---|
| k= | 9.0000E+01 | −1.6182E+01 | −1.9496E+00 | −9.0000E+01 |
| A4= | −3.3726E−02 | −1.3506E−01 | 9.8746E−02 | 7.4238E−02 |
| A6= | 9.0101E−02 | 2.1835E−01 | −9.1285E−02 | −5.8783E−02 |
| A8= | −1.3265E−01 | −1.9845E−01 | 2.7802E−02 | 2.3233E−02 |
| A10= | 5.0508E−02 | 9.2524E−02 | −8.5783E−04 | −5.8476E−03 |
| A12= | 1.6679E−02 | −2.2374E−02 | −1.3177E−03 | 9.7259E−04 |
| A14= | −2.1020E−02 | 2.5115E−03 | 3.3609E−04 | −1.0642E−04 |
| A16= | 7.3967E−03 | −2.6054E−05 | −3.8428E−05 | 7.3468E−06 |
| A18= | −1.1605E−03 | −1.9163E−05 | 2.2091E−06 | −2.8956E−07 |
| A20= | 6.7951E−05 | 1.2020E−06 | −5.1952E−08 | 4.9717E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.59 | Y11/Y72 | 0.49 |
| f/EPD | 1.65 | (R11 + R12)/(R11 − R12) | 1.04 |
| HFOV [deg.] | 40.9 | R13/R1 | −0.67 |
| TL [mm] | 5.77 | f/R12 | −2.15 |
| V20 | 2 | f/R14 | −0.05 |
| (f/EPD) + (TL/ImgH) | 3.14 | f2/f1 | 0.55 |
| CT4/T34 | 1.23 | f4/f | 2.50 |
| ΣCT/CT7 | 5.57 | f6/f7 | −1.44 |
| f/T67 | 5.40 | f/f2 | 0.65 |
| TL/ImgH | 1.49 | f/f7 | −1.70 |

7th Embodiment

Figure 13:
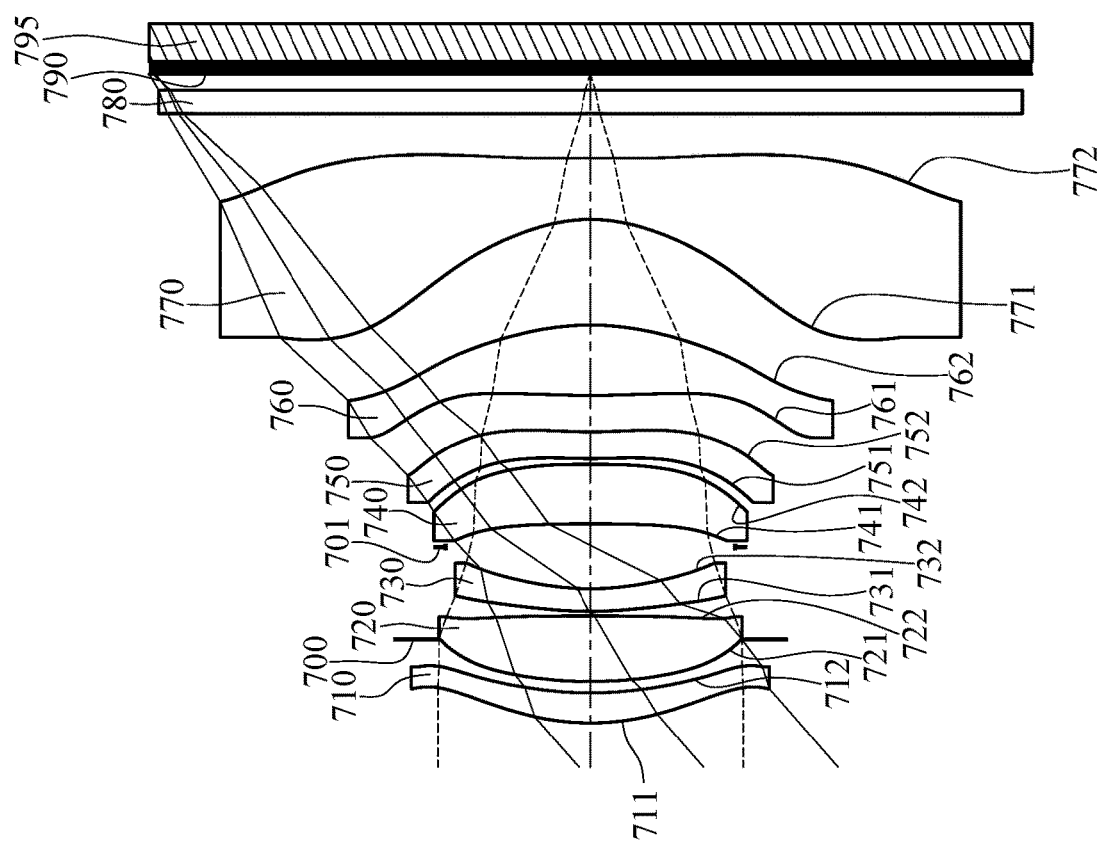
FIG. 13 is a schematic view of an image capturing unit according to the 7th embodiment of the present disclosure.

FIG. 13 is a schematic view of an image capturing unit according to the 7th embodiment of the present disclosure.

Figure 14:
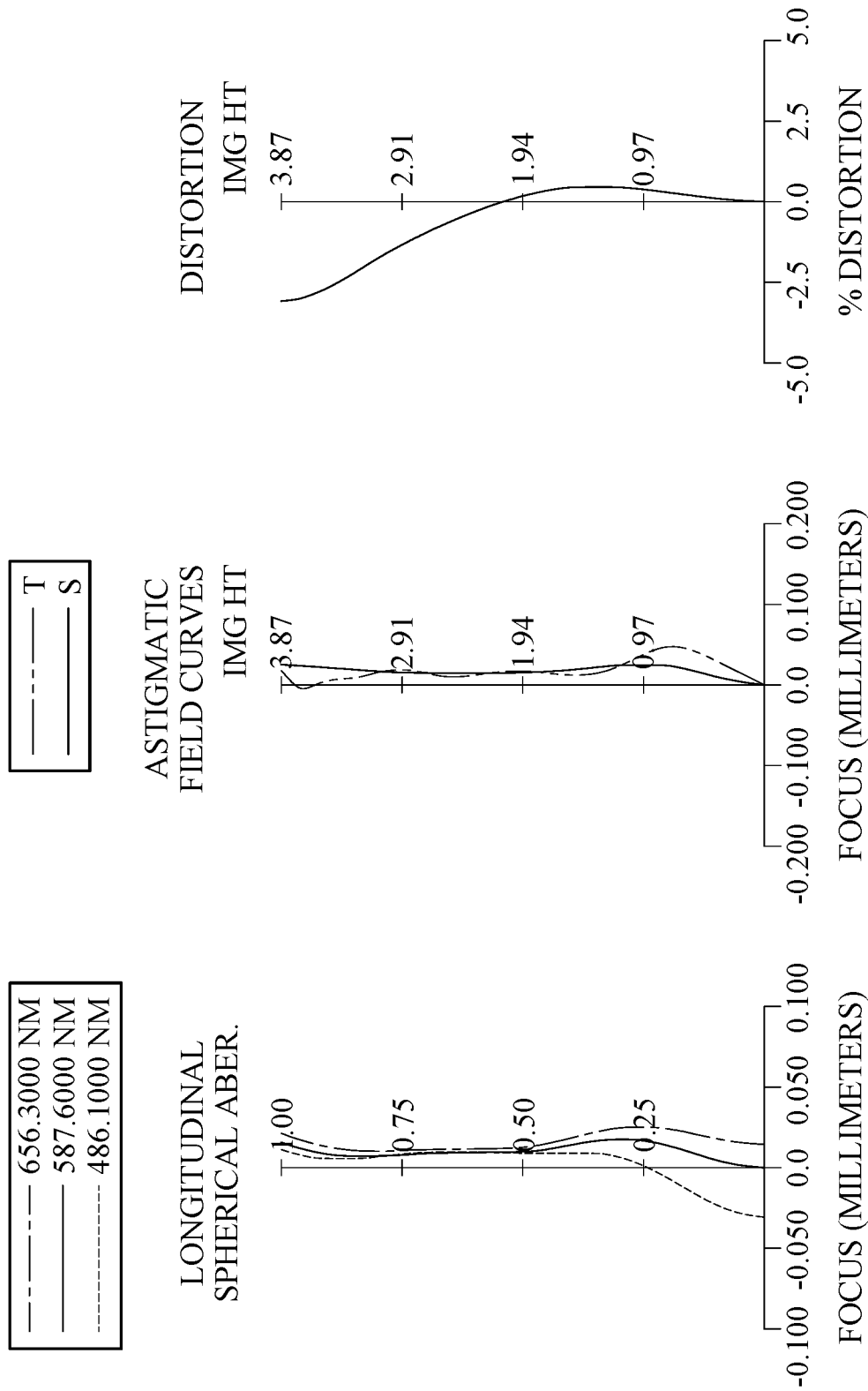
FIG. 14 shows spherical aberration curves, astigmatic field curves and a distortion curve of the image capturing unit according to the 7th embodiment.

FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 795. The photographing optical lens system includes, in order from an object side to an image side, a first lens element 710, an aperture stop 700, a second lens element 720, a third lens element 730, a stop 701, a fourth lens element 740, a fifth lens element 750, a sixth lens element 760, a seventh lens element 770, a filter 780 and an image surface 790. The photographing optical lens system includes seven single and non-cemented lens elements (710, 720, 730, 740, 750, 760 and 770) with no additional lens element disposed between each of the adjacent seven lens elements, wherein there is an air gap between every adjacent lens element.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. Each of the object-side surface 711 and the image-side surface 712 of the first lens element 710 has at least one critical point in an off-axis region thereof. Each of the object-side surface 711 and the image-side surface 712 of the first lens element 710 has at least one inflection point.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric. The image-side surface 722 of the second lens element 720 has at least one critical point in an off-axis region thereof. The image-side surface 722 of the second lens element 720 has at least one inflection point.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. Each of the object-side surface 741 and the image-side surface 742 of the fourth lens element 740 has at least one inflection point.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Each of the object-side surface 751 and the image-side surface 752 of the fifth lens element 750 has at least one critical point in an off-axis region thereof. Each of the object-side surface 751 and the image-side surface 752 of the fifth lens element 750 has at least one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one critical point in an off-axis region thereof. Each of the object-side surface 761 and the image-side surface 762 of the sixth lens element 760 has at least one inflection point.

The seventh lens element 770 with negative refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has at least one critical point in an off-axis region thereof. Each of the object-side surface 771 and the image-side surface 772 of the seventh lens element 770 has at least one inflection point.

The filter 780 is made of glass material and located between the seventh lens element 770 and the image surface 790, and will not affect the focal length of the photographing optical lens system. The image sensor 795 is disposed on or near the image surface 790 of the photographing optical lens system.

The detailed optical data of the 7th embodiment are shown in Table 13 and the aspheric surface data are shown in Table 14 below.

TABLE 13

7th Embodiment
f = 4.60 mm, Fno = 1.69, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.236 | (ASP) | 0.269 | Plastic | 1.544 | 56.0 | 11.01 |
| 2 | | 3.416 | (ASP) | 0.475 | | | | |
| 3 | Ape. Stop | Plano | | −0.372 | | | | |
| 4 | Lens 2 | 4.053 | (ASP) | 0.584 | Plastic | 1.544 | 56.0 | 7.39 |
| 5 | | −492.541 | (ASP) | 0.040 | | | | |
| 6 | Lens 3 | 3.341 | (ASP) | 0.200 | Plastic | 1.688 | 18.7 | −13.24 |
| 7 | | 2.385 | (ASP) | 0.372 | | | | |
| 8 | Stop | Plano | | 0.207 | | | | |
| 9 | Lens 4 | −16.847 | (ASP) | 0.530 | Plastic | 1.544 | 56.0 | −37.87 |
| 10 | | −93.471 | (ASP) | 0.051eb; | | | | |

TABLE 13-continued

7th Embodiment
f = 4.60 mm, Fno = 1.69, HFOV = 41.0 deg.

| Surface # |  | Curvature Radius |  | Thickness | Material | Index | Abbe # | Focal Length |
|---|---|---|---|---|---|---|---|---|
| 11 | Lens 5 | 4.004 | (ASP) | 0.242 | Plastic | 1.688 | 18.7 | −187.20 |
| 12 |  | 3.788 | (ASP) | 0.326 |  |  |  |  |
| 13 | Lens 6 | 8.707 | (ASP) | 0.626 | Plastic | 1.557 | 45.5 | 3.40 |
| 14 |  | −2.360 | (ASP) | 0.943 |  |  |  |  |
| 15 | Lens 7 | −1.397 | (ASP) | 0.545 | Plastic | 1.515 | 56.5 | −2.75 |
| 16 |  | −116.550 | (ASP) | 0.400 |  |  |  |  |
| 17 | Filter |  | Plano | 0.210 | Glass | 1.517 | 64.2 | — |
| 18 |  |  | Plano | 0.141 |  |  |  |  |
| 19 | Image |  | Plano | — |  |  |  |  |

Note:
Reference wavelength is 587.6 nm (d-line).
An effective radius of the object-side surface 731 (Surface 6) is 1.290 mm.
An effective radius of the image-side surface 762 (Surface 14) is 2.770 mm.

TABLE 14

Aspheric Coefficients

| Surface # | 1 | 2 | 4 | 5 | 6 |
|---|---|---|---|---|---|
| k= | −2.2159E+00 | −5.3564E−01 | 4.3942E+00 | −9.0000E+01 | −6.6381E+00 |
| A4= | 1.6974E−02 | 1.4599E−02 | 2.7335E−02 | −7.7856E−02 | −1.1089E−01 |
| A6= | −4.1911E−02 | −9.3975E−02 | −1.0340E−01 | 1.2437E−01 | 9.4349E−02 |
| A8= | 5.6155E−02 | 1.4610E−01 | 2.2281E−01 | −8.4266E−02 | 1.3787E−01 |
| A10= | −7.9328E−02 | −1.5057E−01 | −3.1314E−01 | −8.8246E−02 | −5.4719E−01 |
| A12= | 7.9925E−02 | 1.4280E−01 | 3.6087E−01 | 2.7901E−01 | 8.2559E−01 |
| A14= | −5.1160E−02 | −9.9419E−02 | −2.8978E−01 | −3.0730E−01 | −7.1050E−01 |
| A16= | 1.8774E−02 | 3.9549E−02 | 1.4358E−01 | 1.8369E−01 | 3.6449E−01 |
| A18= | −3.5622E−03 | −7.9032E−03 | −3.9322E−02 | −5.8466E−02 | −1.0394E−01 |
| A20= | 2.6950E−04 | 6.1203E−04 | 4.5887E−03 | 7.7460E−03 | 1.2614E−02 |

| Surface # | 7 | 9 | 10 | 11 | 12 |
|---|---|---|---|---|---|
| k= | −8.0782E−01 | 9.0000E+01 | 9.0000E+01 | −9.0000E+01 | −4.5122E+01 |
| A4= | −6.7550E−02 | −3.2108E−02 | −5.4166E−01 | −6.2290E−01 | −3.3213E−01 |
| A6= | −8.7915E−04 | 1.0193E−01 | 1.8426E+00 | 1.8934E+00 | 7.0650E−01 |
| A8= | 2.3857E−01 | −5.0002E−01 | −4.1317E+00 | −3.9906E+00 | −1.2208E+00 |
| A10= | −5.8941E−01 | 1.1482E+00 | 5.8167E+00 | 5.3897E+00 | 1.3698E+00 |
| A12= | 8.2259E−01 | −1.6127E+00 | −5.3448E+00 | −4.7798E+00 | −1.0066E+00 |
| A14= | −7.1424E−01 | 1.4124E+00 | 3.1838E+00 | 2.7609E+00 | 4.8154E−01 |
| A16= | 3.8357E−01 | −7.5408E−01 | −1.1791E+00 | −9.9463E−01 | −1.4402E−01 |
| A18= | −1.1622E−01 | 2.2534E−01 | 2.4582E−01 | 2.0194E−01 | 2.4324E−02 |
| A20= | 1.5080E−02 | −2.8807E−02 | −2.1974E−02 | −1.7577E−02 | −1.7578E−03 |

| Surface # | 13 | 14 | 15 | 16 |
|---|---|---|---|---|
| k= | 1.6095E+01 | −1.1727E+01 | −1.8668E+00 | −9.0000E+01 |
| A4= | −7.8881E−02 | −7.5689E−02 | 6.5959E−02 | 5.4374E−02 |
| A6= | 1.0132E−01 | 9.0225E−02 | −6.5108E−02 | −4.3076E−02 |
| A8= | −1.2572E−01 | −7.3501E−02 | 2.1964E−02 | 1.6793E−02 |
| A10= | 7.8946E−02 | 3.4163E−02 | −1.9623E−03 | −4.1953E−03 |
| A12= | −3.1058E−02 | −1.2039E−02 | −4.5165E−04 | 7.0130E−04 |
| A14= | 8.5844E−03 | 3.9587E−03 | 1.3617E−04 | −7.7972E−05 |
| A16= | −1.7355E−03 | −9.6327E−04 | −1.4887E−05 | 5.5130E−06 |
| A18= | 2.3502E−04 | 1.2974E−04 | 7.7448E−07 | −2.2319E−07 |
| A20= | −1.5182E−05 | −7.0325E−06 | −1.5935E−08 | 3.9230E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| | 7th Embodiment | | |
|---|---|---|---|
| f [mm] | 4.60 | Y11/Y72 | 0.48 |
| f/EPD | 1.69 | (R11 + R12)/(R11 − R12) | 0.57 |
| HFOV [deg.] | 41.0 | R13/R1 | −0.62 |
| TL [mm] | 5.79 | f/R12 | −1.95 |
| V20 | 2 | f/R14 | −0.04 |
| (f/EPD) + (TL/ImgH) | 3.18 | f2/f1 | 0.67 |
| CT4/T34 | 0.92 | f4/f | −8.24 |
| ΣCT/CT7 | 5.50 | f6/f7 | −1.24 |

-continued

| | 7th Embodiment | | |
|---|---|---|---|
| f/T67 | 4.87 | f/f2 | 0.62 |
| TL/ImgH | 1.49 | f/f7 | −1.67 |

8th Embodiment

Figure 15:
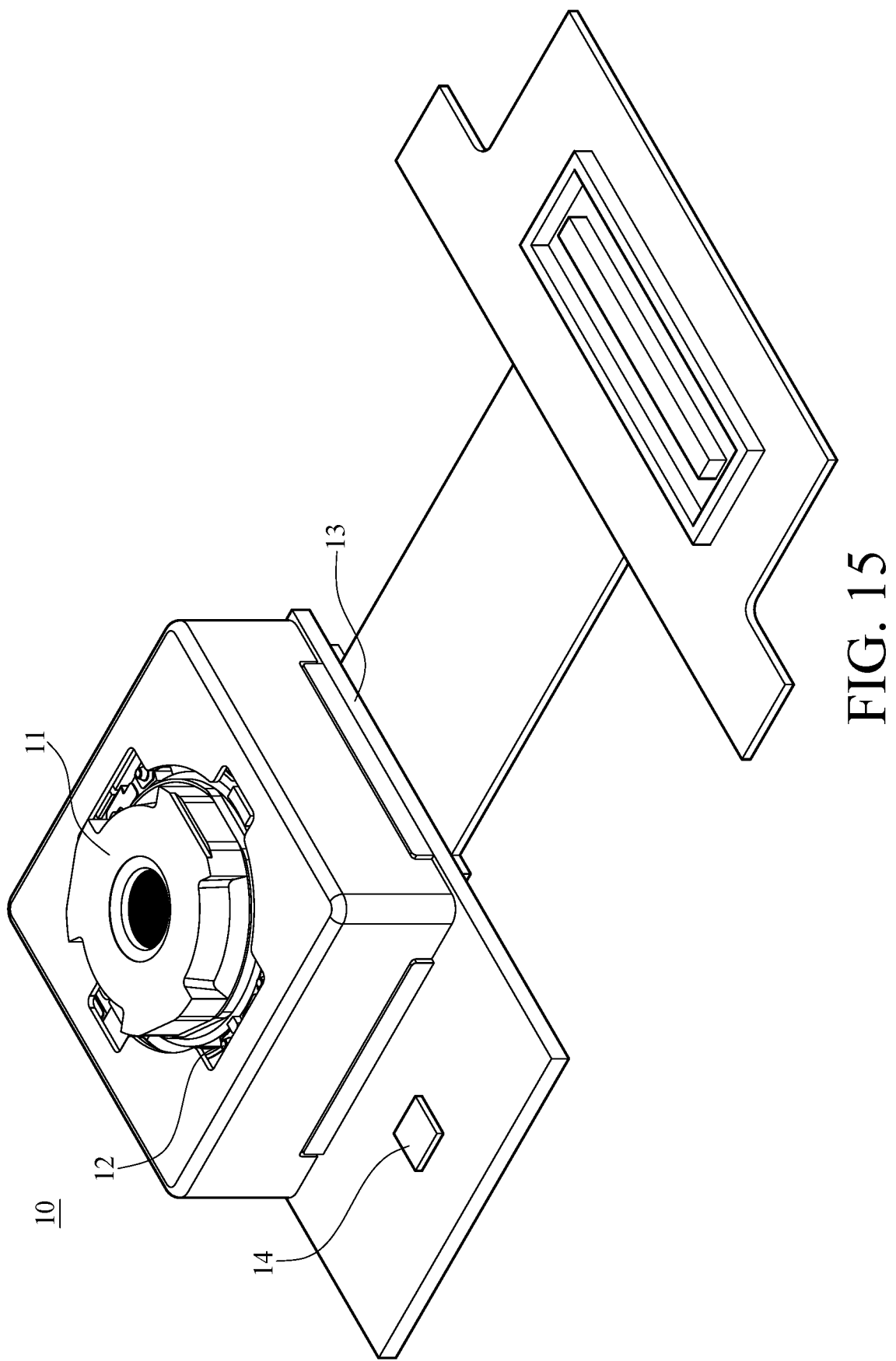
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the photographing optical lens system disclosed in the 1st embodiment, a barrel and a holder member (their reference numerals are omitted) for holding the photographing optical lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

9th Embodiment

Figure 16:
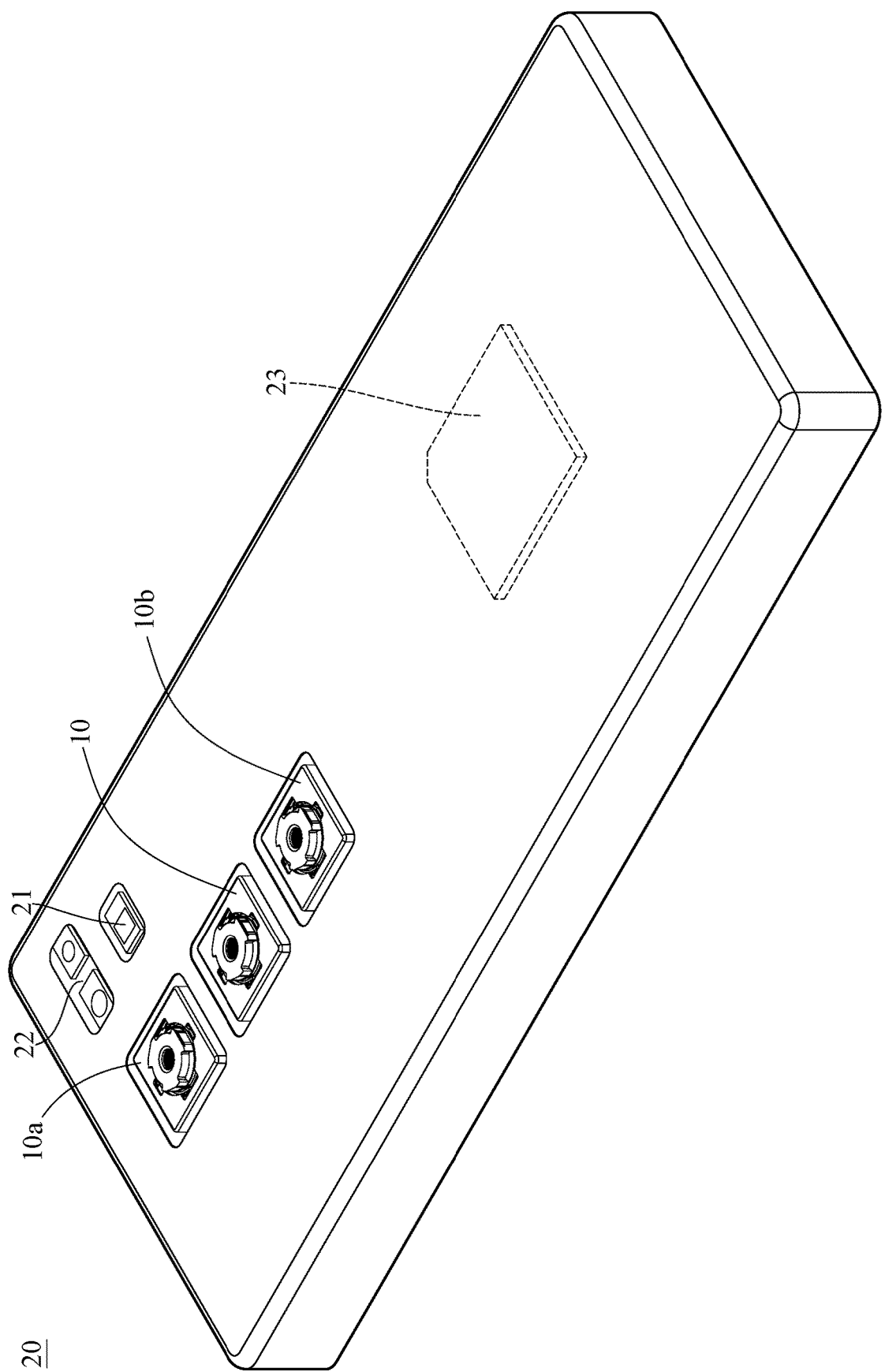
FIG. 16 is one perspective view of an electronic device according to the 9th embodiment of the present disclosure.
Figure 17:
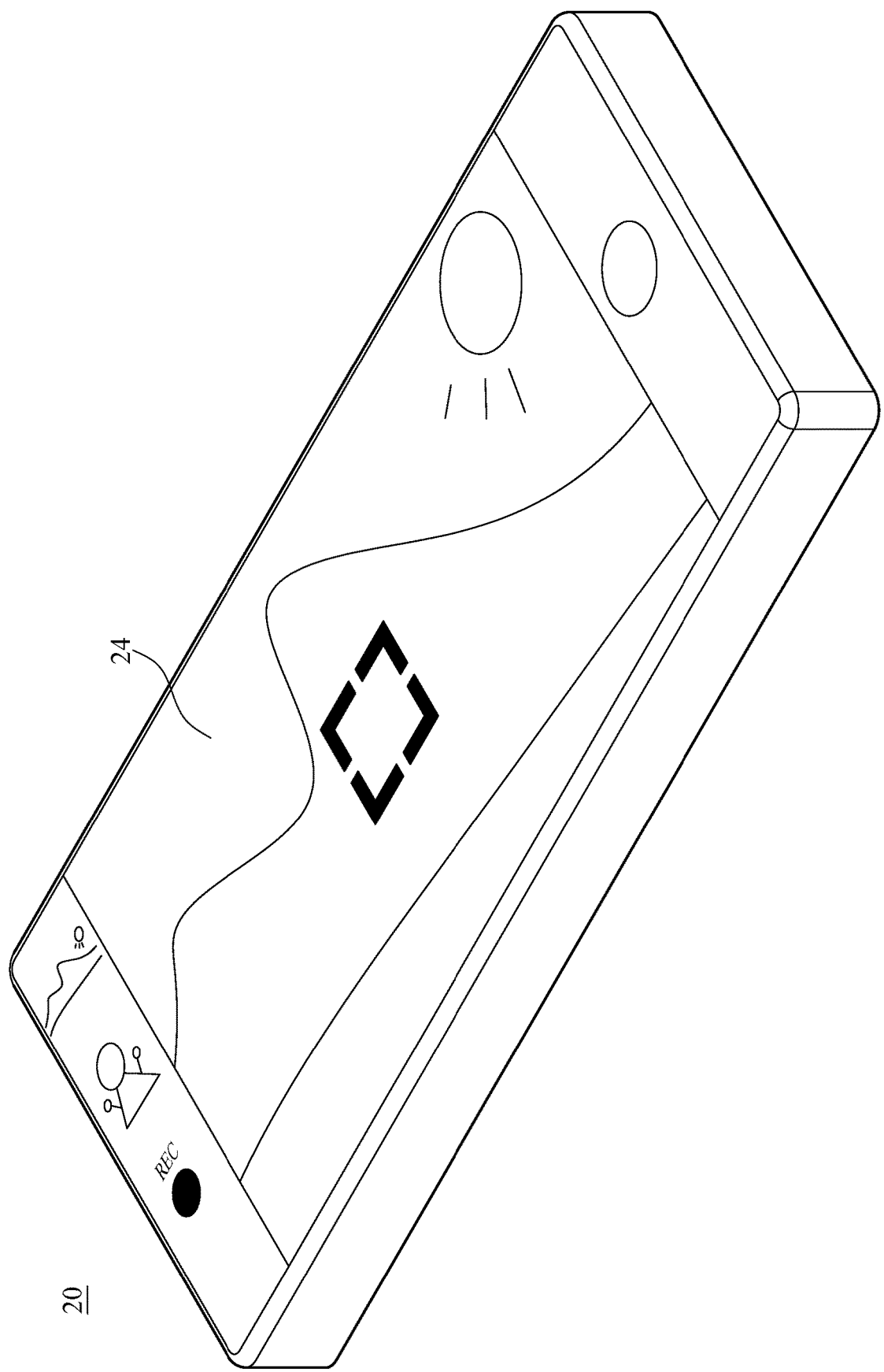
FIG. 17 is another perspective view of the electronic device in FIG. 16.
Figure 18:
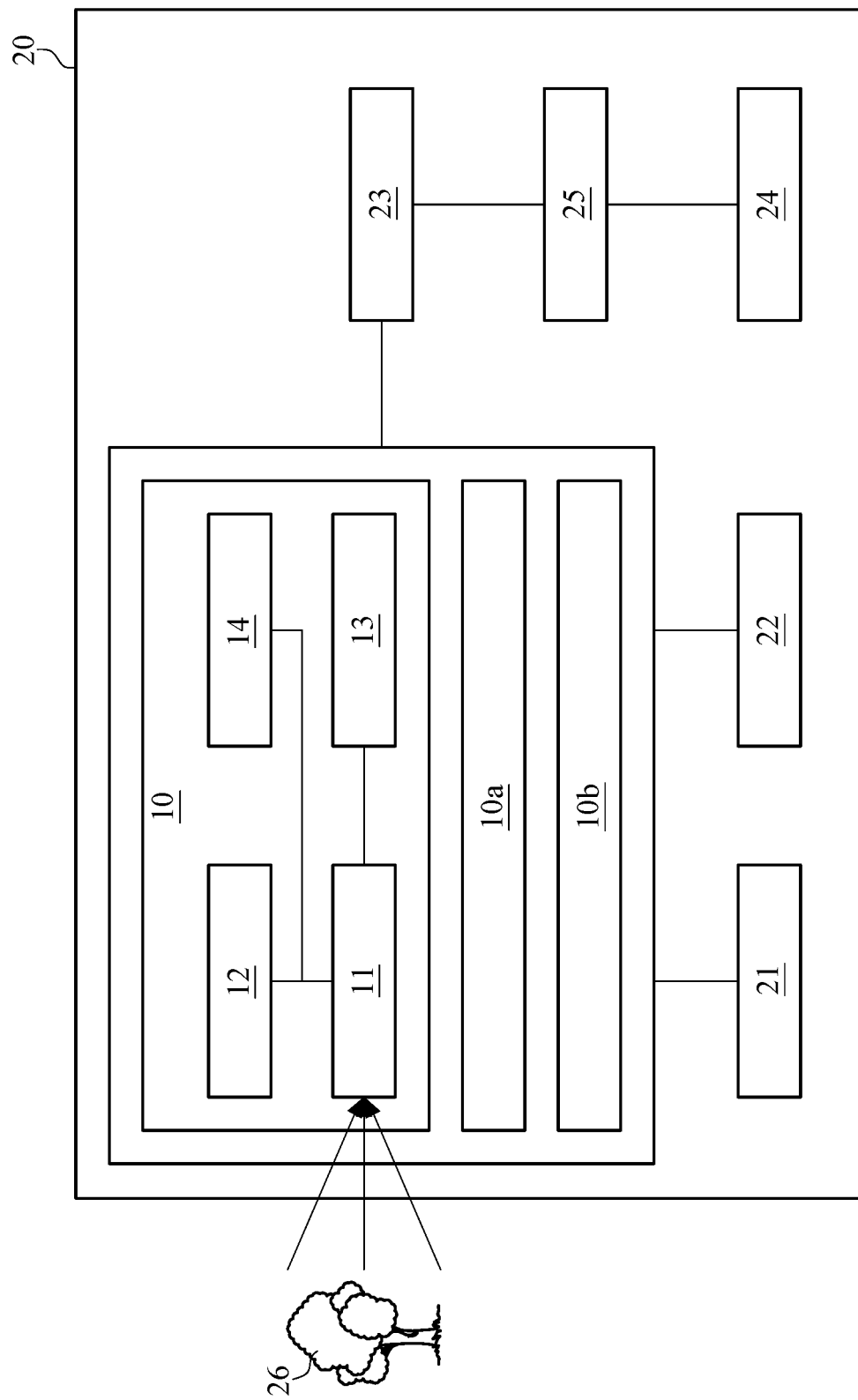
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 20 is a smartphone including the image capturing unit 10 disclosed in the 8th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens system, a barrel and a holder member for holding the lens system.

In this embodiment, the image capturing units 10, 10a, 10b have different fields of view (e.g., the image capturing unit 10a is a wide-angle image capturing unit, the image capturing unit 10b is a telephoto image capturing unit and the image capturing unit 10 has a field of view ranging between that of the image capturing unit 10a and the image capturing unit 10b), such that the electronic device 20 has various magnification ratios so as to meet the requirement of optical zoom functionality. In this embodiment, the electronic device 20 includes multiple image capturing units 10, 10a and 10b, but the present disclosure is not limited to the number of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the first lens element has positive refractive power, the image-side surface of the sixth lens element is concave in a paraxial region thereof, the object-side surface of the seventh lens element is concave in a paraxial region thereof, and at least one of object-side and image-side surfaces of the seven lens elements is aspheric and has at least one inflection point;
wherein an axial distance between the object-side surface of the first lens element and an image surface is TL, a maximum image height of the photographing optical lens system is ImgH, a number of lens elements having an Abbe number smaller than 20 among the seven lens elements is V20, a focal length of the photographing optical lens system is f, a focal length of the fourth lens element is f4, and the following conditions are satisfied:

$TL/ImgH<1.75;$ $2 \leq V20;$ and $-10.0<f4/f \leq 0.$

2. The photographing optical lens system of claim 1, wherein the focal length of the photographing optical lens system is f, a focal length of the seventh lens element is f7, and the following condition is satisfied:

$f/f7<-0.50.$

3. The photographing optical lens system of claim 1, wherein the axial distance between the object-side surface of the first lens element and the image surface is TL, the maximum image height of the photographing optical lens system is ImgH, half of a maximum field of view of the photographing optical lens system is HFOV, and the following conditions are satisfied:

$0.50<TL/ImgH<1.60;$ and $35.0 \text{ [deg.]}<HFOV<65.0 \text{ [deg.]}.$

4. The photographing optical lens system of claim 1, wherein the focal length of the photographing optical lens system is f, an entrance pupil diameter of the photographing optical lens system is EPD, and the following condition is satisfied:

$f/EPD<1.90.$

5. The photographing optical lens system of claim 1, wherein a sum of central thicknesses of all lens elements of the photographing optical lens system is ΣCT, a central thickness of the seventh lens element is CT7, and the following condition is satisfied:

$1.00<\Sigma CT/CT7<20.0.$

6. The photographing optical lens system of claim 1, wherein the focal length of the photographing optical lens system is f, a focal length of the second lens element is f2, and the following condition is satisfied:

$f/f2<0.70.$

7. The photographing optical lens system of claim 1, wherein the focal length of the photographing optical lens system is f, an axial distance between the sixth lens element and the seventh lens element is T67, and the following condition is satisfied:

$f/T67<10.0.$

8. The photographing optical lens system of claim 1, wherein the focal length of the photographing optical lens system is f, an entrance pupil diameter of the photographing optical lens system is EPD, the axial distance between the object-side surface of the first lens element and the image surface is TL, the maximum image height of the photographing optical lens system is ImgH, and the following condition is satisfied:

$1.50<f/EPD+TL/ImgH<3.30.$

9. The photographing optical lens system of claim 1, wherein a focal length of the sixth lens element is f6, a focal length of the seventh lens element is f7, and the following condition is satisfied:

$-1.20 \leq f6/f7<2.00.$

10. The photographing optical lens system of claim 1, wherein the axial distance between the object-side surface of the first lens element and the image surface is TL, the maximum image height of the photographing optical lens system is ImgH, and the following condition is satisfied:

$0.60<TL/ImgH \leq 1.50.$

11. The photographing optical lens system of claim 1, wherein an axial distance between the sixth lens element and the seventh lens element is a maximum among all axial distances between adjacent lens elements of the photographing optical lens system.

12. The photographing optical lens system of claim 1, wherein the third lens element has negative refractive power, the fourth lens element has positive refractive power, the fifth lens element has negative refractive power, the sixth lens element has positive refractive power, the seventh lens element has negative refractive power, a maximum effective radius of the object-side surface of the first lens element is Y11, a maximum effective radius of the image-side surface of the seventh lens element is Y72, and the following condition is satisfied:

$0.10<Y11/Y72<0.60.$

13. The photographing optical lens system of claim 1, wherein a focal length of the first lens element is f1, a focal length of the second lens element is f2, and the following condition is satisfied:

$f2/f1<1.0.$

14. The photographing optical lens system of claim 1, wherein a curvature radius of the object-side surface of the first lens element is R1, a curvature radius of the object-side surface of the seventh lens element is R13, and the following condition is satisfied:

$-3.0<R13/R1<0.$

15. The photographing optical lens system of claim 1, wherein a central thickness of the fourth lens element is CT4, an axial distance between the third lens element and the fourth lens element is T34, and the following condition is satisfied:

$0<CT4/T34<2.50.$

16. The photographing optical lens system of claim 1, wherein the object-side surface of the seventh lens element has at least one convex critical point in an off-axis region thereof.

17. The photographing optical lens system of claim 1, wherein the image-side surface of the sixth lens element has at least one convex critical point in an off-axis region thereof.

18. An image capturing unit, comprising:
the photographing optical lens system of claim 1; and
an image sensor disposed on the image surface of the photographing optical lens system.
19. An electronic device, comprising:
the image capturing unit of claim 18.

* * * * *